(12) United States Patent
Tamura

(10) Patent No.: US 7,602,517 B2
(45) Date of Patent: Oct. 13, 2009

(54) INTERNET FACSIMILE GATEWAY DEVICE

(75) Inventor: Hiroshi Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 454 days.

(21) Appl. No.: 11/497,900

(22) Filed: Aug. 1, 2006

(65) Prior Publication Data

US 2006/0268349 A1 Nov. 30, 2006

Related U.S. Application Data

(63) Continuation of application No. 09/656,414, filed on Sep. 6, 2000, now Pat. No. 7,199,906.

(30) Foreign Application Priority Data

Sep. 6, 1999 (JP) ................................. 11-251035
Feb. 23, 2000 (JP) ............................. 2000-045560

(51) Int. Cl.
*G06F 3/12* (2006.01)
(52) U.S. Cl. ...................... 358/1.15; 358/400; 358/402; 358/403; 358/405; 358/435
(58) Field of Classification Search ................. 358/400, 358/402, 403, 405, 435, 1.15
See application file for complete search history.

(56) References Cited

U.S. PATENT DOCUMENTS

| | | |
|---|---|---|
| 5,701,497 A | 12/1997 | Yamauchi et al. |
| 5,717,945 A | 2/1998 | Tamura |
| 5,818,555 A | 10/1998 | Yokoyama et al. |
| 6,094,277 A | 7/2000 | Toyoda |
| 6,441,916 B1 | 8/2002 | Toyoda |
| 6,496,573 B1 | 12/2002 | Ichimura |

(Continued)

FOREIGN PATENT DOCUMENTS

DE 19812088 9/1998

(Continued)

OTHER PUBLICATIONS

Yu S-F, et al. A multimedia gateway for phone/fax and MIME mail, Computer Communications, Elsevier Science Publishers BV, Amsterdam, NL, vol. 20, No. 8, Aug. 25, 1997, pp. 615-627.

(Continued)

*Primary Examiner*—Twyler L. Haskins
*Assistant Examiner*—Michael Burleson
(74) *Attorney, Agent, or Firm*—Cooper & Dunham, LLP

(57) ABSTRACT

An Internet facsimile gateway device that exchanges image information between a data terminal device and a facsimile device through a telecommunication network and the Internet by taking the steps of transmitting the image information included in an electronic mail message to the facsimile device when the Internet facsimile gateway device receives the electronic mail message requesting image-information transmission to the facsimile device, creating a delivery-confirmation mail message notifying a result of the image-information transmission after the image-information transmission by the Internet facsimile gateway device is completed if the electronic mail message requests the Internet facsimile gateway device to transmit the delivery-confirmation mail message to an original address of the electronic mail message, and transmitting the delivery-confirmation mail message to the original address of the electronic mail message.

11 Claims, 39 Drawing Sheets

U.S. PATENT DOCUMENTS

| | | |
|---|---|---|
| 6,618,165 B1 | 9/2003 | Sehgal |
| 6,650,440 B1 * | 11/2003 | Wing .................. 358/402 |
| 6,687,742 B1 | 2/2004 | Iwazaki |
| 6,700,674 B1 | 3/2004 | Otsuka et al. |
| 6,771,765 B1 | 8/2004 | Crowther et al. |
| 6,928,290 B2 | 8/2005 | Byers et al. |
| 2001/0012222 A1 | 8/2001 | Terasaki |
| 2001/0015968 A1 | 8/2001 | Sicher et al. |
| 2001/0042136 A1 | 11/2001 | Guedalia et al. |
| 2002/0010748 A1 | 1/2002 | Kobayashi et al. |
| 2002/0075520 A1 | 6/2002 | Adegawa |
| 2005/0044150 A1 | 2/2005 | Kaminsky et al. |

FOREIGN PATENT DOCUMENTS

| | | |
|---|---|---|
| EP | 0812100 A2 | 12/1997 |
| EP | 1041809 | 10/2000 |
| EP | 1081934 | 3/2001 |
| JP | 58-139565 | 8/1983 |
| JP | 3-108949 | 5/1991 |
| JP | 6-30040 | 2/1994 |
| JP | 7-162666 | 6/1995 |
| JP | 10-322537 | 12/1998 |
| JP | 11-112762 | 4/1999 |
| WO | WO9859297 | 12/1998 |
| WO | WO9921330 | 4/1999 |
| WO | WO9956459 | 11/1999 |

OTHER PUBLICATIONS

Manister, L., et al., RFC 2532: Extended Facsimile Using Internet Mail, IETF Request for Comments, pp. 1-12.

"Aim and Trend of Internet FAX viewed from information distribution", Topic Report of NTT Technical Journal, Jul. 1998 edition.

RFC2530, Mar. 1999 (http://rfc.net/rfc2530.html).

Jan. 22, 2008 European Office Action in connection with corresponding European patent application No. 00 30 7678.

* cited by examiner

FIG. 8

```
Date: Tue, 16 Feb 1999 13:23:20 +0900 (JST)
From: Mail Delivery Subsystem <MAILER-DAEMON>
Subject: Return receipt
Message-Id:<199902160423.NAA01411@jupiter.abcdcdb.co.jp>
To: user-d@jupiter.abcdcdb.co.jp
MIME-Version: 1.0
Content-Type: multipart/report: report-type=delivery-status;
        boundary="NAA01411.919139000/jupiter.abcdcdb.co.jp"
Auto-Submitted: auto-generated (return-receipt)
X-UIDL: d31657172d7ca5840c19c31b62722f0b
X-winbiff-received-account: jupiter
X-winbiff-flags: Seen This is a MIME-encapsulated message -NAA01411.919139000/jupiter.abcdcdb.co.jp
The original message was received at Tue, 16 Feb 1999 13:22:39+0900 (JST)
from jupiter.abcdcdb.co.jp [111.222.33.44]

---The follwing addresses bad successful delivery notifications---
walk@jupiter (successfully delivered to mailbox)

----Transcript of session follows---- walk@jupiter. Successfully delivered

-NAA01411.919139000/jupiter.abcdcdb.co.jp
Content-Type: message/delivery-status

Reporting-MTA:dns; jupiter.abcdcdb.co.jp
Received-From-MTA: DNS; jupiter.abcdcdb.co.jp
Arrival-Date: Tue, 16 Feb 1999 13:22:39+0900 (JST)

Final-Recipient: RFC822; walk@jupiter
Action: delivered (to mailbox)
Status: 2.1.5
Last-Attempt-Date: Tue, 16 Feb 1999 13:23:20+0900 (JST)
X-Transmitted-NumberOfPage-To-Fax: 5
X-Charge-Information-To-Fax: ¥100

--NAA01411.919139000/jupiter.abcdcdb.co.jp

Content-Type: text/rfc822-headers

Return-Path: <user-d@jupiter.abcdcdb.co.jp>
Received: from host (jupiter.abcdcdb.co.jp [111.222.33.44])
        by jupiter.abcdcdb.co.jp (8.9.1/3.7Wjupiter sendmail.cf v8) with ESMTP id NAA01410
        for walk@jupiter. Tue. 16 Feb 1999 13:22:39+0900 (JST)
Date: Tue, 16 Feb 1999 13:22:39+0900 (JST)
From: user-d <user-d@jupiter.abcdcdb.co.jp>
Message-Id: <199902160422.NAA01410@jupiter.abcdcdb.co.jp>

--NAA01411.919139000/jupiter.abcdcdb.co.jp
```

DSN (DELIVERED) MAIL

FIG.9

```
Date: Tue, 16 Feb 1999 13:25:03 +0900 (JST)
From: Mail Delivery Subsystem <MAILER-DAEMON>
Subject: Returned mail: User unknown
Message-Id: <199902160425.NAA01419@jupiter.abcdcdb.co.jp>
To: user-d@jupiter.abcdcdb.co.jp
MIME-Version: 1.0
Content-Type: multipart/report; report-type=delivery-status;
        boundary="NAA01419.919139103/jupiter.abcdcdb.co.jp"
Auto-Submitted: auto-generated(failure)
X-UIDL: cb1b4451b3b95d56bbc67dc7c462c33d
X-winbiff-received-account: jupiter
X-winbiff-flags: Seen This is a MIME-encapsulated message --NAA01419.919139103/jupiter.abcdcdb.co.jp
The original message was received at Tue, 16 Feb 1999 13:23:47+0900 (JST)
from jupiter.abcdcdb.co.jp [111.222.33.44]

-----The following addresses bad permanent fatal errors----
abc@abcddcba.co.jp

-----Transcript of session follows-----
..while talking to dsp2.abcddcba.co.jp.:
>>> RCPT To:<abc@abcddcba.co.jp>
<<<550<abc@abcddcba.co.jp>..User unknown
550 abc@abcddcba.co.jp.. User unknown --NAA01419.919139103/jupiter.abcdcdb.co.jp
Content--Type:message/delivery-status Reporting--MTA:dns; jupiter.abcdcdb.co.jp
Received-From-MTA: DNS; jupiter.abcdcdb.co.jp
Arrival-Date: Tue, 16 Feb 1999 13:23:47+0900(JST)

Final-Recipient: RFC822; abc@abcddcba.co.jp
Action: failed
Status: 5.1.1
Remote-MTA: DNS: dsp2.abcddcba.co.jp
Diagnostic-Code: SMTP; 550 <abc@abcddcba.co.jp>..User unknown
Last-Attempt-Date: Tue, 16 Feb 1999 13:25:03+0900 (JST)

--NAA01419.919139103/jupiter.abcdcdb.co.jp
Content-Type: message/rfc822

ATTACHED MESSAGE
--NAA01419.919139103/jupiter.abcdcdb.co.jp
```

DSN (FAILED) MAIL

FIG.10A

```
Date: Tue, 16 Feb 1999 13:41:13+0900
From: user-d@abcddcba.co.jp
Message-ID:<36C8F6E9.39C6DC2F@abcddcba.co.jp>
Subject: Return Receipt (displayed)-test
To: user-d@jupiter.abcdcdb.co.jp
References: <19990216134143N.user-d@abcddcba.co.jp>
MIME-Version: 1.0
Content-Type: multipart/report: report-type=disposition-notification;
          boundary="------------mdn97D5884EAE879BD0C9F642A9"
X-UIDL: c56bf5fb9c1b735902cfb990613c74d1
X-winbiff-received-account:jupiter
X-winbiff-flags:Seen ------------mdn97D5884EAE879BD0C9F642A9
Content-Type: text/plain; charset=iso-2022-jp
Content-Transfer-Encoding: 7bit This is a Return Receipt for the mail that you sent to
user-d@abcddcba.co.jp.

Note:this Return Receipt only acknowledges that the message was
displayed on the recipient's machine. There is no guarantee that the
content bas been read or understood.

------------mdn97D5884EAE879BD0C9F642A9
Content-Type:message/disposition-notification; name="MDNPart2.txt"
Content-Disposition:inline
Content-Transfer-Encoding: 7bit Reporting-UA: tulip.abcddcba.co.jp; Mozilla 4.5 [ja] (Win95;1)
Final-Recipient: rfc822; user-d@abcddcba.co.jp
Original-Message-ID: <19990216134143N.user-d@abcddcba.co.jp>
Disposition: manual-action/MDN-sent-manually; displayed
X-Transmitted-NumberOfPage-To-Fax: 5
X-Charge-Information-To-Fax: ¥100
                ========= (CONTINUED) ============
```

MDN (DISPLAYED) MAIL

---------------mdn97D5884EAE879BD0C9F642A9
Content-Type: text/rfc822-headers; name="MDNPart3.txt"
Content-Transfer-Encoding: 7bit
Content-Disposition: inline Received: from lily.abcddcba.co.jp(lily.abcddcba.co.jp
[111.222.33.55])
       by jupiter.abcdcdb.co.jp (8.9.1/3.7Wjupiter sendmail-cf v8) with
SMTP id NAA01448
       for <nmw@jupiter.abcdcdb.co.jp>; Tue, 16 Feb 1999 13:44:04+0900
(JST)
Received: from localhost by lily-abcddcba.co.jp
(5.67+1.6W/2.8Wb-91Jan07)
       id AA01425; Tue, 16 Feb 99 13:41:44 JST
To: nmw@jupiter.abcdcdb.co.jp
Subject: test
Disposition-Notification-To: user-d@jupiter.abcdcdb.co.jp
X-Mailer: Mew version 1.93 on Emacs 19.28 / Mule 2.3 (SUETSUMUHANA)
Mime-Version: 1.0
Content-Type: Text/Plain; charset=us-ascii
Content-Transfer-Encoding: 7bit
Message-Id: <19990216134143N.user-d(@abcddcba.co.jp>
Date: Tue, 16 Feb 1999 13:41:43+0900
From: user-d <user-d@abcddcba.co.jp>
X-Dispatcher: imput version 980905 (IM100)
Lines: 1
X-UIDL: 8614c297fa493494f978b1193317e40e -------------mdn97D5884EAE879BD0C9F642A9-

MDN (DISPLAYED) MAIL (CONTINUED)

FIG.16A

| RECEPTION ABILITY INFORMATION #1 |
|---|
| ------- |
| RECEPTION ABILITY INFORMATION #m |

(RECEPTION ABILITY TABLE)

FIG.16B

| TELEPHONE NUMBER |
|---|
| RECEPTION ABILITY |

(RECEPTION ABILITY INFORMATION)

FIG. 17

```
Date:Tue, 16 Feb 1999 13:23:20+0900 (JST)
From: Mail Delivery Subsystem <MAILER-DAEMON>
Subject: Return receipt
Message-Id: <199902160423.NAA01411@jupiter.abcddcba.co.jp>
To: user-d@jupiter.abcddcba.co.jp
MIME-Version: 1.0
Content-Type: multipart/report: report-type=delivery-status;
        boundary="NAA01411.919139000/jupiter.abcddcba.hor.co.jp"
Auto-Submitted: auto-generated (return-receipt)

This is a MIME-encapsulated message

--NAA01411.919139000/jupiter.abcddcba.hor.co.jp
The original message was received at Tue, 16 Feb 1999 13:22:39+0900(JST)
from jupiter.abcddcba.hor.co.jp [111.222.33.44]

---The following addresses bad successful delivery notifications---
Fax=+81-3-9876-5432@jupiter.(Successfully dispatched)

----Transcript of session follows----
Fax=+81-3-9876-5432@jupiter...Successfully dispatched --NAA01411.919139000/jupiter.abcddcba.co.jp
Content-Type: message/delivery-status Reporting--MTA:dns; jupiter.abcdcba.hor.co.jp
Received-From-MTA: DNS: jupiter.abcdcba.hor.co.jp
Arrival-Date; Tue, 16 Feb 1999 13:22:39+0900(JST)

Final-Recipient: RFC822; Fax=+81-3-9876-5432@jupiter
Action:dispatched
Status: 2.0.0
Last-Attempt-Date:Tue, 16 Feb 1999 13:23:20+0900(JST)
Media-Accept-Features: (& (color-Binary)(image-file-structure=[TIFF-S])
              (| (& (dpi=200) (dpi-xyratio=200/100)) (& (dpi=200)(dpi-xyratio=1)))
              (image-coding=[MII,MR,MMR])(MRC-mode=0)(paper-size=[A4,B4]))
X-G3Fax-JM: V.34,V.17,V.29,V.27ter
X-G3Fax-INTERNET: T.37 simple mode
X-G3Fax-CSA: kilo@medaka.pole.co.jp
X-G3Fax-NSF: 000000004176ca8c7b99038ccf3aa3231488776f5ccb --NAA01411.919139000/jupiter.abcddcba.hor.co.jp
Content-Type: text/rfc822-headers Return-Path: <user-d@jupiter.abcddcba.hor.co.jp>
Received: from host (jupiter.abcddcba.hor.co.jp [111.222.33.44])
    by jupiter.abcddcba.hor.co.jp (8.9.1/3.7Wjupiter sendmail-cf v8) with ESMTP id NAA01410
    for Fax=+81-3-9876-5432@jupiter, Tue, 16 Feb 1999 13:22:39+0900 (JST)
Date: Tue, 16 Feb 1999 13:22:39+0900 (JST)
From: Full Name <user-d@jupiter.abcddcba.hor.co.jp>
Message-Id: <199902160422.NAA01410@jupiter.abcdcba.hor.co.jp>

--NAA01411.919139000/jupiter.abcddcba.hor.co.jp----
```

DSN MAIL (WITH RECEPTION ABILITY)

FIG. 18

```
Date:Tue. 16 Feb 1999 13:41:13+0900
From: Fax-Gateway@jupiter.abcddcba.hor.co.jp
Message-ID:<36C8F6E9.39C6DC2F@jupiter.abcddcba.hor.co.jp>
Subject: Return Receipt (dispatched)-test
To: user-d@jupiter.abcddcba.hor.co.jp
References: <19990216134143N.user-d@mie.hor.co.jp>
MIME-Version: 1.0
Content-Type: multipart/report; report-type=disposition-notification;
        boundary="————mdn97D5884EAE879BD0C9F642A9"

————mdn97D5884EAE879BD0C9F642A9
Content-Type: text/plain; charset=iso-2022-jp
Content-Transfer-Encoding: 7bit This is a Return Receipt for the mail that you sent to
user-d@jupiter.abcddcba.hor.co.jp.

Note: this Return Receipt only acknowledges that the message was
sent to the recipient's machine. There is no guarantee th at tbe
content has been read or understood.

————mdn97D5884EAE879BD0C9F642A9
Content-Type: message/disposition-notification;
Content-Disposition: inline
Content-Transfer-Encoding: 7bit Reporting-UA; jupiter.abcddcba.hor.co.jp; Jupiter.Gateway
Final-Recipient: RFC822; Fax=+81-3-9876-5432@jupiter
Original-Message-ID: <19990216134143N.user-d@jupiter.abcddcba.hor.co.jp>
Disposition: manual-action/MDN-sent-manually: dispatched
Media-Accept-Features: (& (color=Binary)(image-file-structure=[TIFF-S])
          (| & (dpi=200) (dpi-xyratio=200/100)) (& (dpi=200) (dpi-xyratio=1)))
          (image-coding=[MH,MR,MMR])(MRC-mode=0) (paper-size=[A4,B4]))
X-G3Fax-JM: V.34,V.17,V.29,V.27ter
X-G3Fax-INTERNET: T.37 simple mode
X-G3Fax-CSA: naka@medaka.pole.co.jp
X-G3Fax-NSF: 000000004f76ca8c7b99038ccf3aa.3231488776f5ccb ————mdn97D5884EAE879BD0C9F642A9
Content-Type: text/rfc822-headers;
Content-Transfer-Encoding: 7bit
Content-Disposition: inline Received: from lily abcddcba.hor.co.jp (jupiter.abcddcba.hor.co.jp[111.222.33.55])
     by jupiter.abcddcba.hor.co.jp (8.9.1/3.7Wjupiter sendmail.cf v8) with SMTP id NAA01448
     for <Fax=+81-3-9876-5432@jupiter.abcddcba.hor.co.jp>; Tue, 16 Feb 1999 13:44:04+0900(JST)
Received: from localhost by jupiter.abcddcba.hor.co.jp (8.9.1/3.7Wjupiter sendmail.cf v8)
     id AA01425; Tue, 16 Feb 99 13:41:44 JST
To: Fax=+81-3-9876-5432@jupiter.abcddcba.hor.co.jp
Subject:test
Disposition-Notification-To: user-d@jupiter.abcddcba.hor.co.jp
Message-Id: <19990216134143N.user-d@jupiter.abcddcba.hor.co.jp>
Date: Tue, 16 Feb 1999 13:41:43+0900
From: Hiroshi User-d <user-d@jupiter.abcddcba.hor.co.jp>

————mdn97D5884EAE879BD0C9F642A9———
```

MDN MAIL (WITH RECEPTION ABILITY)

FIG. 20C

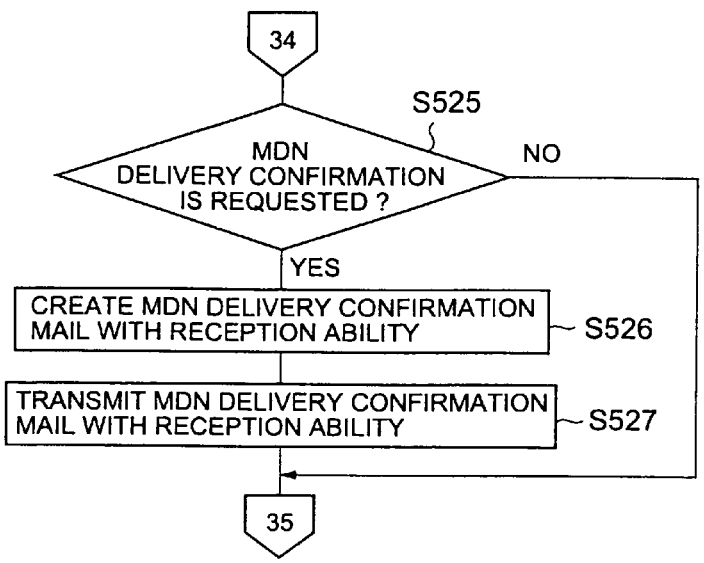

FIG. 21

```
Date: Tue, 16 Feb 1999 13:23:20 +0900 (JST)
From: Mail Delivery Subsystem <MAILER-DAEMON>
Subject: Return receipt
Message-Id:<199902160423.NAA01411@jupiter.mie.hor.co.jp>
To: user-d@jupiter.abcddcbahor.co.jp
MIME-Version: 1.0
Content-Type: multipart/report; report-type=delivery-status;
        boundary="NAA01411.919139000/jupiter.abcddcba.co.jp"
Auto-Submitted: auto-generated(return-receipt)

--NAA01411.919139000/jupiter.abcddcba.co.jp

Fax=046-999-9999@jupiter (successfully relayed to fax)

--NAA01411.919139000/jupiter.abcddcba.hor.co.jp
Content-Type: message/delivery-status Reporting-MTA: dns;server abcddcba.hor.co.jp
Received-From-MTA: DNS; server.abcddcba.hor.co.jp
Arrival-Date: Tue, 16 Feb 1999 13:22:39+0900(JST)

Final-Recipient:RFC822; MAILER-DAEMON@abcddcba.hor.co.jp
Action:relayed
Status: 2.0.0

--NAA01411.919139000/jupiter.abcddcba.hor.co.jp----
```

DSN (RELAYED) MAIL

FIG.22

```
Date:Tue, 16 Feb 1999 13:41:13+0900
From: Mail Delivery Subsystem <MAILER-DAEMON>
Message-ID: <36C8F6E9.39C6DC2F@abcddcba.hor.co.jp>
Subject: Return Receipt
To: user-d@jupiter.abcddcba.hor.co.jp
References: <19990216134143N.user-d@abcddcba.hor.co.jp>
MIME-Version: 1.0
Content-Type: multipart/report; report-type=disposition-notification;
          boundary="-----------mdn97D5884EAE879BD0C9F642A9"

-------------mdn97D5884EAE879BD0C9F642A9
Content-Type: text/plain; charset=iso-2022-jp
Content-Transfer-Encoding: 7bit FAX=046-999-9999@abcddcba.hor.co.jp  (successfully dispatched to fax)

-------------mdn97D5884EAE879BD0C9F642A9
Content-Type: message/disposition-notification;
Content-Disposition: inline
Content-Transfer-Encoding: 7bit Reporting-UA: server.abcddcba.hor.co.jp;
Final-Recipient: rfc822; MAILER-DAEMON@abcddcba.hor.co.jp
Original-Message-ID: <19990216134143N.user-d@abcddcba.hor.co.jp>
Disposition: manual-action/MDN-sent-manually; dispatched ---------------mdn97D5884EAE879BD0C9F642A9--
```

MDN (DISPATCHED) MAIL

FIG.23

```
Date:Tue. 16 Feb 1999 13:23:20 +0900 (JST)
From: Mail Delivery Subsystem <MAILER-DAEMON>
Subject: Return receipt
Message-ID: <199902160423.NAA01411@jupiter.abcddcba.hor.co.jp>
To: user-d@jupiter.abcddcba.hor.co.jp
MIME-Version: 1.0
Content-Type: multipart/report; report-type=delivery-status;
         boundary="NAA01411.919139000/jupiter.abcddcba.hor.co.jp"
Auto-Submitted: auto-generated (return-receipt)

--NAA01411.919139000/jupiter.abcddcba.hor.co.jp

FAX=046-999-9999(G3fax-signal MCFs was responded for the whole pages.)

--NAA01411.919139000/jupiter.abcddcba.hor.co.jp
Content-Type: message/delivery-status Reporting-MTA: dns; server.abcddcba.hor.co.jp
Received-From-MTA: DNS; jupiter.abcddcba.hor.co.jp
Arrival-Date: Tue, 16 Feb 1999 13:22:39f0900 (JST)

Final-Recipient: RFC822; Fax=046-999-9999@jupiter
Action: delivered
Status: 2.0.0

--NAA01411.919139000/jupiter.abcddcba.hor.co.jp----
```

DSN (DELIVERED) MAIL

FIG.24

Date:Tue, 16 Feb 1999 13:41:13+0900
From: Mail Delivery Subsystem <MAILER-DAEMON>
Message-ID: <36C8F6E9.39C6DC2F@abcddcba.hor.co.jp>
Subject: Return Receipt
To: user-d@jupiter.abcddcba.hor.co.jp
References: <19990216134143N.user-d@abcddcba.hor.co.jp>
MIME-Version: 1.0
Content-Type: multipart/report; report-type=disposition-notification;
　　　　　boundary="-----------mdn97D5884EAE879BD0C9F642A9"

--------------mdn97D5884EAE879BD0C9F642A9
Content-Type: text/plain; charset=iso-2022-jp
Content-Transfer-Encoding-7bit FAX=046-999-9999(G3fax-signal MCFs was responded for the whole pages.)

--------------mdn97D5884EAE879BD0C9F642A9
Content-Type: message/disposition-notification
Content-Disposition: inline
Content-Transfer-Encoding: 7bit Reporting-UA: server.abcddcba.hor.co.jp;
Final-Recipient: rfc822; Fax=046-999-9999@jupiter
Original-Message-ID: <19990216134143N.user-d@abcddcba.hor.co.jp>
Disposition: manual-action/MDN-sent-manually; dispatched ----------------mdn97D5884EAE879BD0C9F642A9--

MDN (DISPLAYED) MAIL

FIG. 25

```
Date:Tue, 16 Feb 1999 13:25:03 +0900 (JST)
From: Mail Delivery Subsystem <MAILER-DAEMON>
Subject: Return receipt
Message-ID: <199902160425.NAA01419@jupiter.mie.hor.co.jp>
To: user-d@jupiter.abcddcba.hor.co.jp
MIME-Version: 1.0
Content-Type: multipart/report; report-type=delivery-status;
         boundary="NAA01419.919139103/jupiter.abcddcba.hor.co.jp"
Auto-Submitted: auto-generated (failure)

--NAA01419.919139103/jupiter.abcddcba.hor.co.jp

FAX=046-999-9999(G3fax-signal MCFs was not responded for some pages.)

--NAA01419.919139103/jupiter.abcddcba.hor.co.jp
Content-Type: message/delivery-status Reporting-MTA: dns; server.abcddcba.hor.co.jp
Received-From-MTA: DNS; jupiter.abcddcba.hor.co.jp
Arrival-Date: Tue, 16 Feb 1999 13:23:47f0900 (JST)

Final-Recipient: RFC822; Fax=046-999-9999@jupiter
Action: failed
Status: 5.0.0
Remote-MTA: DNS; server.abcddcba.hor.co.jp
Diagnostic-Code: SMTP; 554 Transaction failed <Fax=046-999-9999>

--NAA01419.919139103/jupiter.abcddcba.hor.co.jp--
```

DSN (FAILED) MAIL

FIG.26

```
Date:Tue. 16 Feb 1999 13:25:03+0900 (JST)
From: Mail Delivery Subsystem <MAILER-DAEMON>
Subject: Return Receipt
Message-Id: <199902160425.NAA01419@jupiter.abcddcba.hor.co.jp>
To: user-d@jupiter.abcddcba.hor.co.jp
MIME-Version: 1.0
Content-Type: multipart/report; report-type=delivery-status;
         boundary="NAA01419.919139103/jupiter.abcddcba.hor.co.jp"
Auto-Submitted: auto-generated (failure)

--NAA01419.919139103/jupiter.abcddcba.hor.co.jp

FAX=046-999-9999(G3fax-signal MCFs was not responded for some pages.)

--NAA01419.919139103/jupiter.abcddcba.hor.co.jp
Content-Type: message/delivery-status Reporting-MTA:dns; server.abcddcba.hor.co.jp
Received-From-MTA: DNS; jupiter.abcddcba.hor.co.jp
Arrival-Date: Tue, 16 Feb 1999 13:23:47+0900 (JST)

Final-Recipient: RFC822; Fax=046-999-9999@jupiter
Action: failed
Status: 5.0.0
Remote-MTA: DNS; server.abcddcba.hor.co.jp
Diagnostic-Code: SMTP; 554 Transaction failed <Fax=046-999-9999>

--NAA01419.919139103/jupiter.abcddcba.hor.co.jp--
```

MDN (FAILED) MAIL

INTERNET FACSIMILE GATEWAY DEVICE

This application is a Rule 1.53(b) continuation of U.S. Ser. No. 09/656,414, filed Sep. 6, 2000 now U.S. Pat. No. 7,199,906, the entire contents of which are hereby incorporated by reference herein.

BACKGROUND OF THE INVENTION

1. Field of the Invention

The present invention relates to an Internet facsimile gateway device that includes a function to exchange image information with a facsimile device through a telecommunication network and a function to exchange image information through the Internet by use of electronic mail, and a method of controlling the Internet facsimile gateway device.

2. Description of the Related Art

Recently, an Internet facsimile gateway device has been in practical use, wherein the Internet facsimile gateway device includes a function to exchange image information with a G3 facsimile device through an analog public network and a function to exchange the image information by use of electronic mail through the Internet.

Additionally, another type of the Internet facsimile gateway device is in practical use, wherein the Internet facsimile gateway device includes a function to exchange the image information with a G4 facsimile device through the ISDN and a function to exchange the image information through the Internet by use of electronic mail.

A use of such Internet facsimile gateway devices makes it possible to exchange various messages between a host device connected to the Internet and a G3 facsimile device connected to the analog public network or between a host device connected to the Internet and a G4 facsimile device connected to the ISDN.

The host device transmits an electronic mail message requesting image-information transmission to the Internet facsimile gateway device when the host device needs to transmit image information to a G3 facsimile device that is connected to the analog public network. The Internet facsimile gateway device then manages image-information transmission processes.

Accordingly, the host device as a sender cannot keep track of transmission of image information to the G3 facsimile device, and cannot easily confirm a delivery of the image information to the G3 facsimile device.

SUMMARY OF THE INVENTION

Accordingly, it is a general object of the present invention to provide an Internet facsimile gateway device that enables a sender of image information to easily confirm a transmission condition of the image information transmitted to a facsimile device as a receiver, and a method of controlling the Internet facsimile gateway device, in which the disadvantages described above are eliminated.

The above-described object of the present invention is achieved by an Internet facsimile gateway device connected to a telecommunication network and the Internet, including:

an image-information transmitting unit that transmits image information included in an electronic mail message to a facsimile device when the Internet facsimile gateway device receives the electronic mail message requesting image-information transmission to the facsimile device;

a delivery-confirmation-mail creating unit that creates a delivery-confirmation mail message notifying a result of the image-information transmission after the image-information transmission by the Internet facsimile gateway device is completed, if the electronic mail message requests the Internet facsimile gateway device to transmit the delivery-confirmation mail message to an original address of the electronic mail message; and a delivery-confirmation-mail transmitting unit that transmits the delivery-confirmation mail message to the original address of the electronic mail message.

Other objects, features and advantages of the present invention will become more apparent from the following detailed description when read in conjunction with the accompanying drawings.

It should be note that, hereinafter, an electronic mail message is referred to as an email message.

BRIEF DESCRIPTION OF THE DRAWINGS

FIG. 8 is a schematic diagram showing one form of a DSN delivery-confirmation mail message that indicates a successful transmission;

FIG. 9 is a schematic diagram showing one form of the DSN delivery-confirmation mail message that indicates a failed transmission;

FIGS. 10A and 10B are schematic diagrams showing one form of a MDN delivery-confirmation mail message that indicates a successful transmission;

FIGS. 16A and 16B are schematic diagrams showing a reception ability table and reception ability information;

FIG. 17 is a schematic diagram showing one form of the DSN delivery-confirmation mail message that includes the reception ability information;

FIG. 18 is a schematic diagram showing one form of the MDN delivery-confirmation mail message that includes the reception ability information;

FIGS. 20A, 20B and 20C are flowcharts showing a second image-information transmission process taken by the facsimile gateway device GFa in the second embodiment of the present invention;

FIG. 21 is a schematic diagram showing one form of the DSN delivery-confirmation mail message that includes a notification "relayed";

FIG. 22 is a schematic diagram showing one form of the MDN delivery-confirmation mail message that includes a notification "dispatched";

FIG. 23 is a schematic diagram showing one form of the DSN delivery-confirmation mail message that includes a notification "delivered";

FIG. 24 is a schematic diagram showing one form of the MDN delivery-confirmation mail message that includes a notification "displayed";

FIG. 25 is a schematic diagram showing one form of the DSN delivery-confirmation mail message that includes a notification "failed";

FIG. 26 is a schematic diagram showing one form of the MDN delivery-confirmation mail message that includes a notification "failed";

FIGS. 27A, 27B and 27C are flowcharts showing a third image-information transmission process taken by the facsimile gateway device GF in the first embodiment of the present invention.

DESCRIPTION OF THE PREFERRED EMBODIMENTS

A description will now be given of a preferred embodiment of the present invention, with reference to the accompanying drawings.

Figure 1:
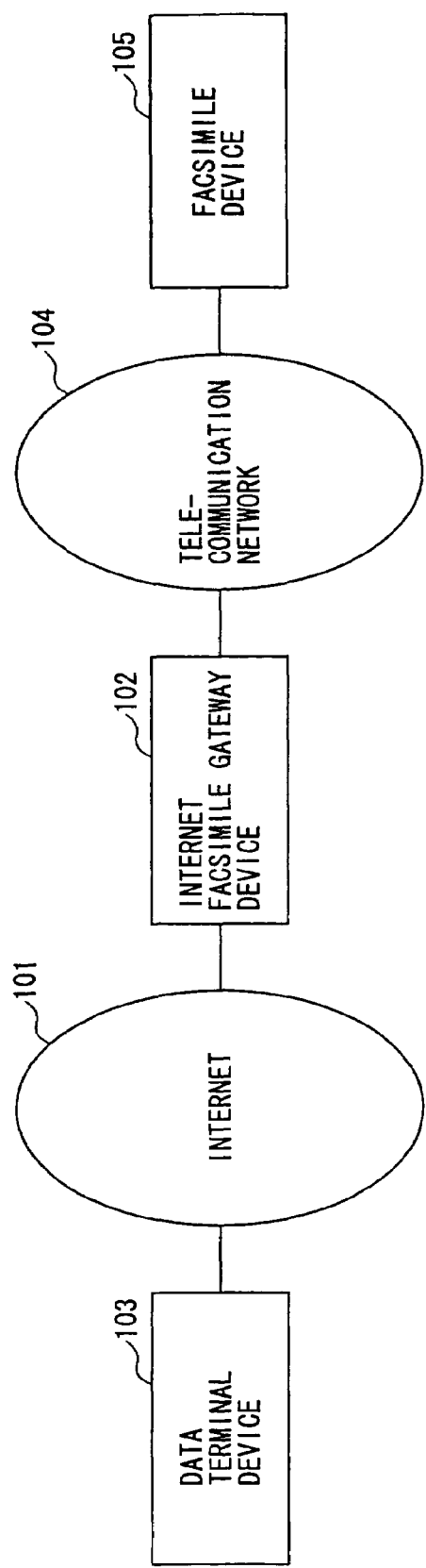
FIG. 1 is a schematic diagram of a facsimile communication system that includes a facsimile gateway device according to the present invention.

FIG. 1 is a schematic diagram of a facsimile communication system that includes a facsimile gateway device according to the present invention. This facsimile communication system includes the Internet 101, an Internet facsimile gateway device 102, a data terminal device 103, a telecommunication network 104 and a facsimile device 105.

Figure 2:
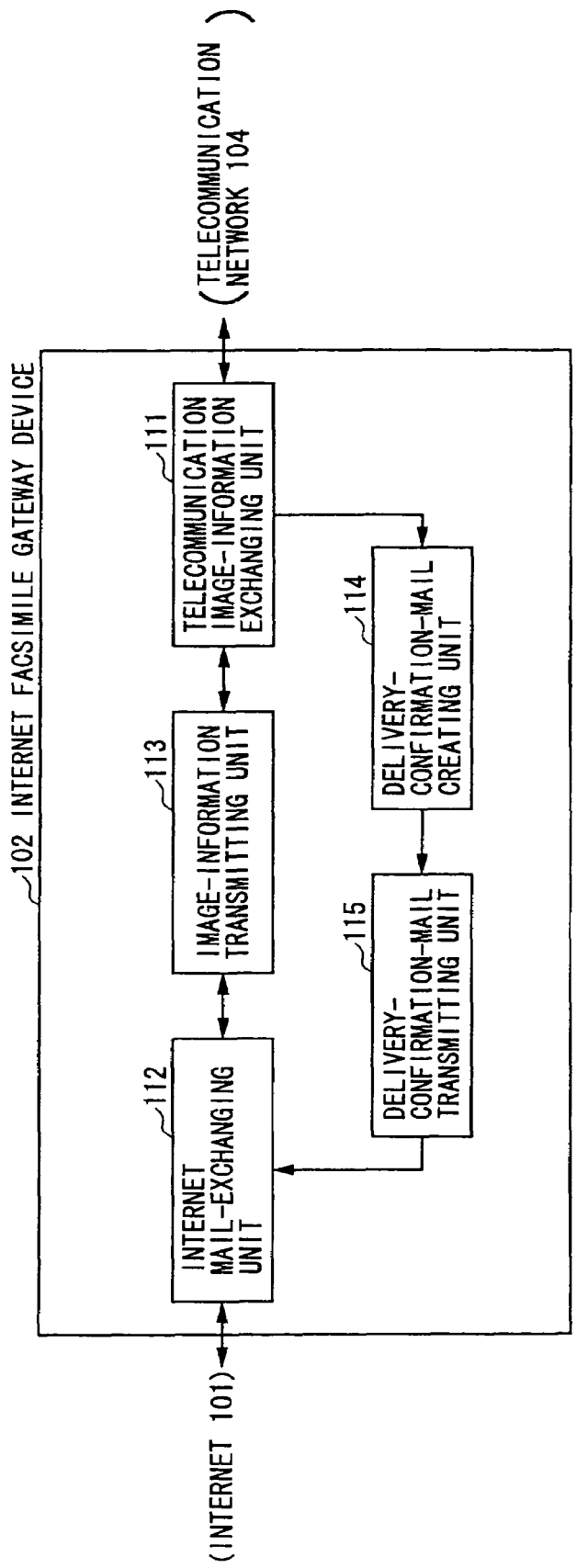
FIG. 2 is a schematic diagram of the facsimile gateway device according to the present invention.

The Internet facsimile gateway device 102 is an Internet facsimile gateway device connected to the Internet 101 and the telecommunication network 104, and includes a telecommunication image-information exchanging unit 111, an Internet mail-exchanging unit 112, an image-information transmitting unit 113, a delivery-confirmation-mail creating unit 114 and a delivery-confirmation-mail transmitting unit 115, as shown in FIG. 2.

The telecommunication image-information exchanging unit 111 exchanges image information with the facsimile device 105 through the connected telecommunication network 104. The Internet mail-exchanging unit 112 exchanges the image information by use of electronic mail through the connected Internet 101. The image-information transmitting unit 113 transmits the image information included in an email message to the facsimile device 105 when the Internet facsimile gateway device 102 receives the email message requesting image-information transmission to the facsimile device 105. The image-information transmitting unit 113 also transmits image information received from the facsimile device 105 to the data terminal device 103. The delivery-confirmation-mail creating unit 114 creates a delivery-confirmation mail message notifying a result of the image-information transmission after the image-information transmission by the Internet facsimile gateway device 102 is completed, if the email message requests the Internet facsimile gateway device 102 to transmit the delivery-confirmation mail message to an original address of the email message. The delivery-confirmation-mail transmitting unit 115 transmits the delivery-confirmation mail message to the original address of the email message.

The data terminal device 103 is a host device connected to the Internet 101. The facsimile device 105 is connected to the telecommunication network 104. The above described facsimile communication system makes it possible to exchange image information between the data terminal device 103 and the facsimile device.

In the facsimile communication system, the image information is transmitted from the data terminal device 103 through the Internet facsimile gateway device 102 to the facsimile device 105 by taking the following steps.

The data terminal device 103 creates an email message in a fixed format that includes the image information, and transmits the created email message to the Internet facsimile gateway device 102 as a first step to transmit the image information to the facsimile device 105. It should be noted that, hereinafter, the email message in the fixed format that includes the image information is referred to as a transmission request message.

At the first step, the data terminal device 103 also includes destination address information of the facsimile device 105, in this case, a telephone number of the facsimile device 105 in the transmission request message. Subsequently, the data terminal device 103 transmits the transmission request message to the Internet facsimile gateway device 102. The Internet facsimile gateway device 102 receives the email message that includes the destination address information through its Internet mail-exchanging unit 112, and then decides the received email message as the transmission request message, extracts the image information therefrom, and transmits the image information by use of its image-information transmitting unit 113 through its telecommunication image-information exchanging unit 111 to the facsimile device 105 after calling a destination address specified by the destination address information. Subsequently, the delivery-confirmation-mail creating unit 115 located in the Internet facsimile gateway device 102 creates a delivery-confirmation mail message notifying a result of the image-information transmission after an image-information transmission by the Internet facsimile gateway device 102 is completed if the received email message requests the Internet facsimile gateway device 102 to transmit the delivery-confirmation mail message to the data terminal device 103. The delivery-confirmation-mail transmitting unit 115 then transmits the delivery-confirmation mail message to the data terminal device 103.

The image information is transmitted from the facsimile device 105 through the Internet facsimile gateway device 102 to the data terminal device 103 by taking the following steps.

The facsimile device 105 calls the Internet facsimile gateway device 102 as a first step to transmit the image information to a user of the data terminal device 103. Subsequently, the facsimile device 105 specifies a user mail address as the destination address of the image information, and transmits the image information to the Internet facsimile gateway device 102.

When the facsimile device 105 calls the Internet facsimile gateway device 102, and the user mail address is specified as the destination address of the image information, the Internet facsimile gateway device 102 starts storing the image information received through its telecommunication image-information exchanging unit 111 from the facsimile device 105. The Internet facsimile gateway device 102 then creates an email message that includes the stored image information and the specified user mail address, and transmits the created email message by its image-information transmitting unit 113 through the Internet mail-exchanging unit 112 to a mail server that transmits the email message to the specified user mail address. Subsequently, the mail server transmits the email message received from the Internet facsimile gateway device 102 to the specified user mail address. It should be noted that, hereinafter, the email message that includes the stored image information and the specified user mail address is referred to as a delivery email message.

The Internet facsimile gateway device 102 is provided with a function to receive the email message, and can interpret a SMTP command directly from the received email message.

Figure 3:
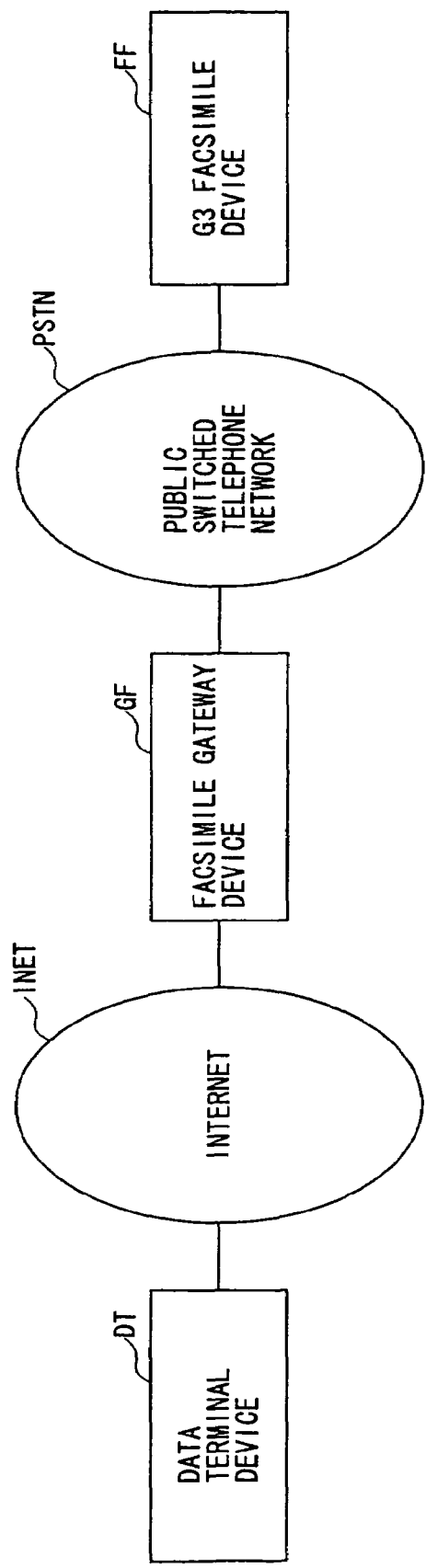
FIG. 3 is a schematic diagram of a facsimile communication system according to a first embodiment of the present invention.

FIG. 3 is a schematic diagram of a facsimile communication system according to a first embodiment of the present invention.

This facsimile communication system includes the Internet INET, a facsimile gateway device GF, a data terminal device DT, a public switched telephone network PSTN and a G3 facsimile device FF.

The facsimile gateway device GF is an Internet facsimile gateway device connected to the Internet INET and the public switched telephone network PSTN.

The data terminal device DT is a host device connected to the Internet INET. The G3 facsimile device FF is connected to the public switched telephone network PSTN that is an analog public network. The facsimile communication system makes it possible to exchange image information between the data terminal device DT and the G3 facsimile device FF. An image-information transmission process in this facsimile communication system is executed similarly as described above with FIG. 1 and FIG. 2.

Figure 4:
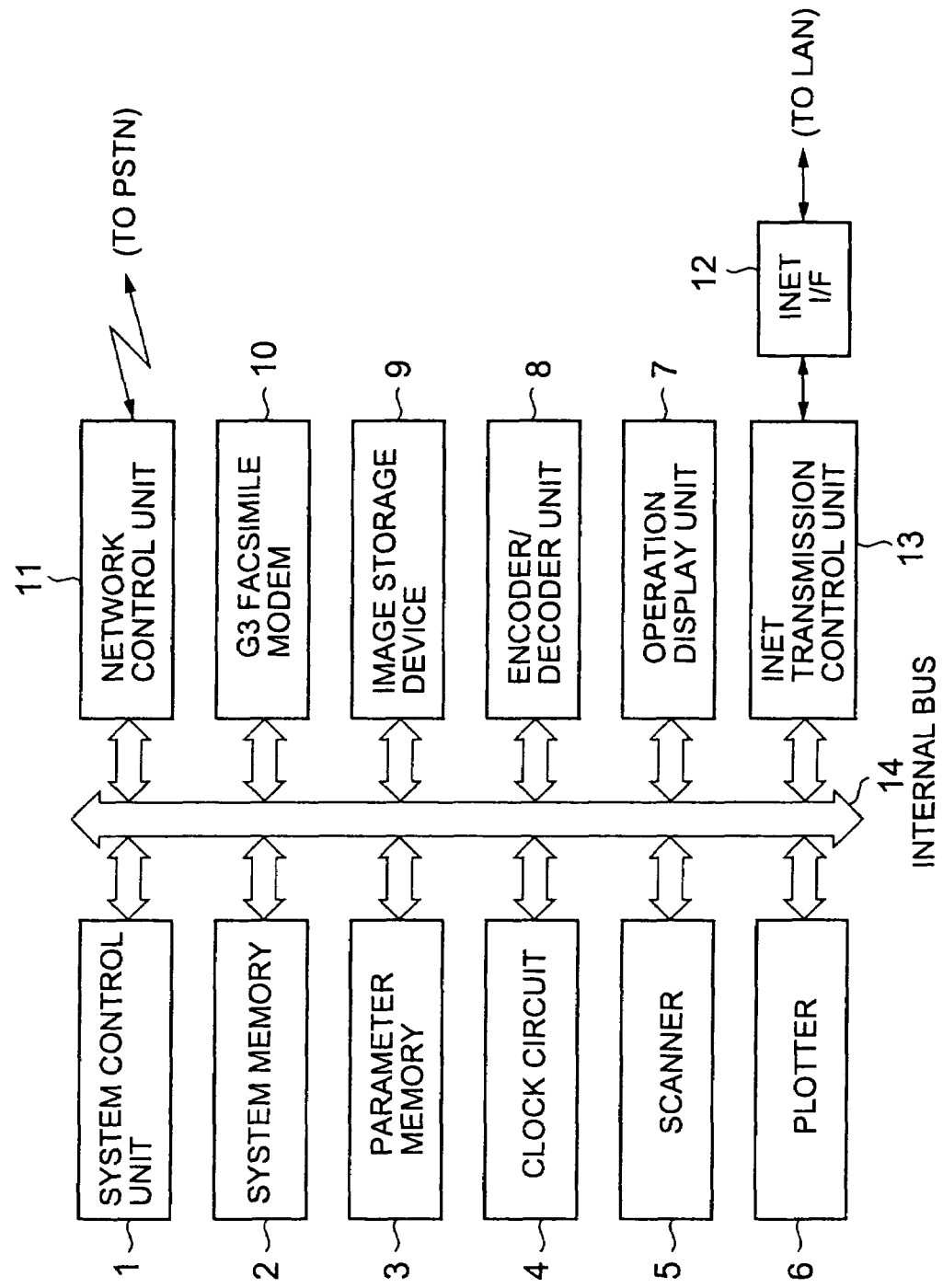
FIG. 4 is a block diagram showing components of a facsimile gateway device GF in the first embodiment of the present invention.

FIG. 4 is a block diagram showing components of the facsimile gateway device GF in the first embodiment of the present invention.

As shown in FIG. 4, the facsimile gateway device GF includes a system control unit 1, a system memory 2, a parameter memory 3, a clock circuit 4, a scanner 5, a plotter 6, an operation display unit 7, an encoder/decoder unit 8, an image storage device 9, a G3 facsimile modem 10, a network control unit 11, an Internet interface circuit 12, an Internet transmission control unit 13, and an internal bus 14.

The system control unit 1 controls each unit in the facsimile gateway device GF and executes control processes such as a facsimile transmission control process. The system memory 2 stores a control program executed by the system control unit 1 and data necessary for an execution of the control program, and is used as a working area for the system control unit 1. The parameter memory 3 stores various types of information for controlling the facsimile gateway device GF. The clock circuit 4 outputs current time information.

The scanner 5 reads a manuscript image with a fixed resolution. The plotter 6 prints out an image with a fixed resolution. The operation display unit 7 includes all types of operation keys and indicators for operating the facsimile gateway device GF.

The encoder/decoder unit 8 encodes and compresses an image signal, and also decodes and expands an encoded image signal back to an original image signal. The image storage unit 9 stores encoded image information.

The G3 facsimile modem includes a low-speed modem function of V. 21 modem or the like to exchange a transmission procedure signal, and a high-speed modem function of a V. 17 modem, a V. 34 modem, a V. 29 modem, a V. 27ter modem, or the like to mainly exchange the image information.

The network control unit 11 includes an automatic send/receive function and connects the facsimile gateway device GF to the analog public network PSTN.

The Internet interface circuit 12 connects the facsimile gateway device GF to the Internet INET. The Internet transmission control unit 13 executes a communication control process by using a variety of fixed protocol suites for exchanging data with other data terminal devices through the Internet INET. For instance, the Internet transmission control unit 13 executes Send/receive processes of the email message.

The internal bus 14 is connected to the system control unit 1, the system memory 2, the parameter memory 3, the clock circuit 4, the scanner 5, the plotter 6, the operation display unit 7, the encoder/decoder unit 8, the image storage device 9, the G3 facsimile modem 10, the network control unit 11 and the Internet transmission control unit 13. A data exchange among each unit in the facsimile gateway device GF is processed mainly through the internal bus 14.

Additionally, the network control unit 11 and the G3 facsimile modem 10 exchanges data directly with each other.

In the embodiment of the present invention, the Internet transmission control unit 13 executes the communication control process by applying a protocol suite that is a combination of a transmission protocol TCP/IP (Transmission Control Protocol/Internet Protocol) and a communication protocol, wherein the transmission protocol TCP/IP is used for layers up to a transport layer, and the communication protocol is used for layers which is higher than the transport layer. For instance, a SMTP (Simple Mail Transfer Protocol) is applied as the communication protocol to an email data exchange.

Additionally, communication protocols such as the TCP/IP, the SMTP and a POP (Post Office Protocol), a data format and a data structure of the email message are regulated by a RFC (Request For Comments) document published by the IETF (Internet Engineering Task Force). For example, the TCP, the IP and the SMTP are regulated respectively by a RFC 793, a RFC 793 and a RFC 821. The data format of the email message is regulated by a RFC 822, a RFC 1521 and a RFC 1522 (a MIME format).

Additionally, in the embodiment of the present invention, the email message is used for exchanging facsimile image information through the Internet INET. Since the facsimile image information is binary data and cannot be directly included in the email message, the facsimile image information is included in the email message by being converted to readable information (a 7 bits character code) by applying a fixed conversion method, for example, a BASE 64 encoding method. The above-described format of text information in the email message is called the MIME (Multi Purpose Message Extension) format.

Figure 5:
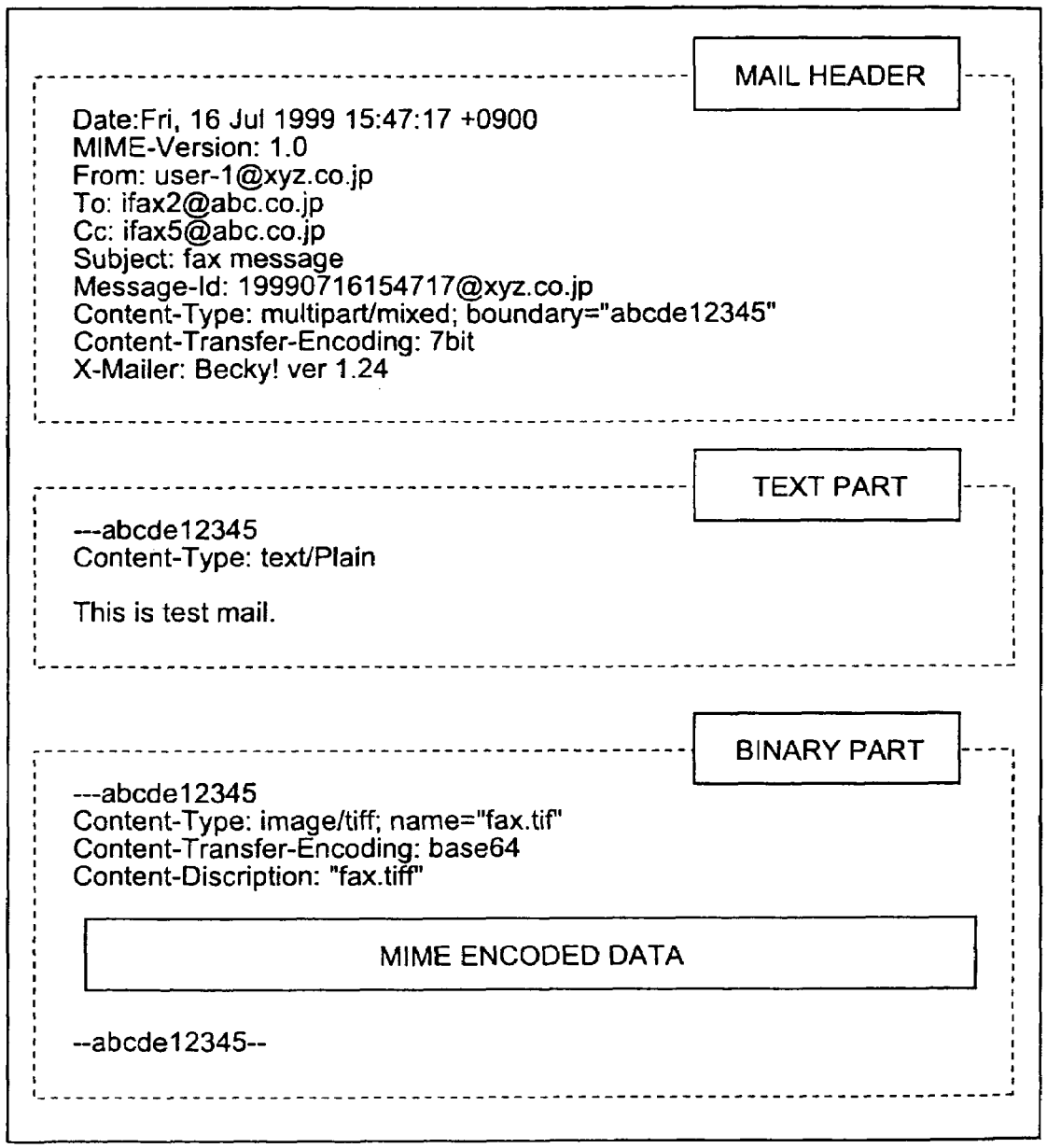
FIG. 5 is a schematic diagram showing one form of an electronic mail message.

FIG. 5 shows one form of the email message used for transmitting the facsimile image information. It should be noted that an entire format of the email message is regulated by a RFC 2305 (a simple mode facsimile).

The email message shown in FIG. 5 is an email message having plural parts in a multipart MIME format, and has a mail header, a text part and a binary part. The mail header includes fixed information, for example, "Date:" field, a "To:" field and a "From:" field. The "Date:" field contains a time and a date when the email message is transmitted. The "To:" field contains a destination mail address. The "From:" field contains a sender's mail address. The text part includes text data to be transmitted. The binary part includes the facsimile image information that is converted to a MIME encoded data.

Additionally, the facsimile image information transmitted with the email message is converted to the MIME encoded data by the following steps. The facsimile image information is initially compressed by a MH encoding method. Subsequently, the compressed facsimile image information is converted to a TIFF-F format. The TIFF-F formatted facsimile image information is then converted to the MIME format.

Since image files can be unified as single image file in the TIFF-F format, single image information file including plural image information files can be placed in single binary part in the email message.

Additionally, when the data terminal device DT transmits the transmission request message to the facsimile gateway device GF, the destination address information of the G3 facsimile device FF is set in the "To:" field of the transmission request message in the following format.

FAX="International Telephone Number" @ "Domain Name"

"International Telephone Number" is an international telephone number of the G3 facsimile device FF. "Domain Name" is a domain name of the facsimile gateway device GF. The above-shown format of the destination address information of the G3 facsimile device FF is regulated by the RFC 2304.

A format to place the destination address information of the G3 facsimile device FF is not limited to the above-described format. For instance, the destination address information may be placed in the text part, in one of the multipart MIME, or in a "Subject:" field of the mail header.

Figure 6:
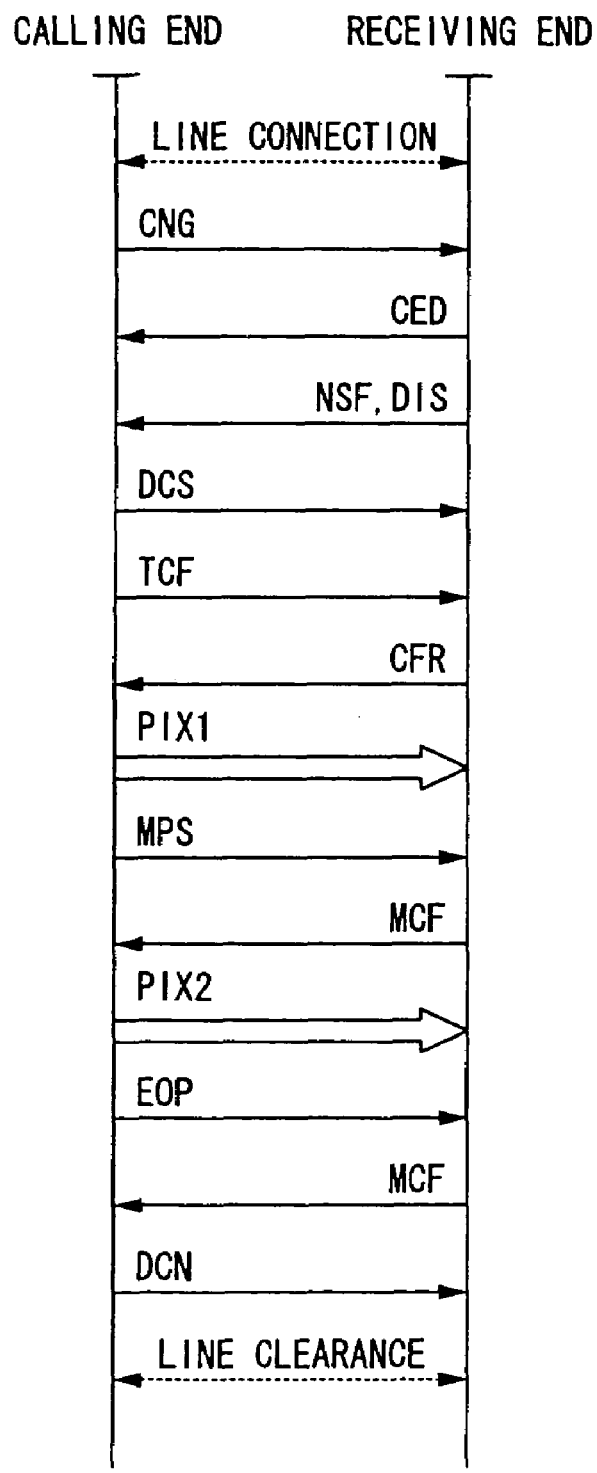
FIG. 6 is a time chart showing an image-information transmission procedure taken by a G3 facsimile device.

FIG. 6 shows an image-information transmission procedure taken by the G3 facsimile device FF. This transmission procedure is taken for a transmission of the image information between the G3 facsimile device FF and the facsimile gateway device GF. It should be noted that, hereinafter, the transmission procedure taken by the G3 facsimile device FF is referred to as a G3 facsimile transmission procedure.

The calling end initially calls the receiving end. After a communication line between the calling end and the receiving end is connected, the calling end sends a signal CNG to the receiving end in order to identify the receiving end. After detecting the signal CNG, the receiving end sends a signal CED (Called Station Identification), a signal CSI (Called Subscriber Identification) and a signal DIS (Digital Identification Signal) one after another to the calling end for notifying identification information and transmission function information of an own terminal device on the receiving end to the calling end.

The calling end, after receiving the signal CSI and the signal DIS from the receiving end, decides a transmission function to use, and sends a signal SID, a signal SUB, a signal TSI (Transmitting Subscriber Identification) and a signal DCS (Digital Command Signal) one after another to the receiving end for notifying a notification address, a sub address, the identification information of the own terminal device on the calling end and the transmission function information to the receiving end.

Additionally, the calling end executes a modem training procedure by sending out a signal TCF (Training Check) to the receiving end. The receiving end sends a signal CFR (Confirmation to Receive) to the calling end in response to the signal TCF therefrom, and prepares for a reception of the image information.

In this example of the transmission procedure, the image information includes two pages of the image. The calling end sends a first page of the image information PIX 1 and then a signal MPS (Multi-Page Signal) to the receiving end. The signal MPS is sent from the calling to notify the receiving end that there exists the following page to be transmitted.

The receiving end sends a signal MCF (Message Confirmation) to the calling end if and only if the receiving end receives the first page of the image information PIX 1 and a transmission result of the PIX 1 is good. The receiving end then prepares for the reception of the next page of the image information in response to the received signal MPS.

Subsequently, the calling end sends a second page of the image information PIX 2 and then a signal EOP (End of Procedure) notifying the second page is the last page of the transmission to the receiving end.

The receiving end sends the signal MCF to the calling end if and only if the receiving end receives the second page of the image information PIX 2 and the transmission result of the PIX 2 is good. The receiving end does not proceed to prepare for the reception of the next page of the image information since the receiving end receives the signal EOP.

At the last step of the transmission procedure, the calling end sends a signal DCN to the receiving end, and then clears a line to the receiving end. The receiving end also clears the line to the calling end after receiving the signal DCN from the calling end. Consequently, the transmission procedure of the image information between the calling end and the receiving end is completed.

A description will now be given of a delivery confirmation method to confirm a delivery of the image information.

As described above, the data terminal device DT initially transmits the transmission request message to the facsimile gateway device GF when the data terminal device DT transmits the image information to the G3 facsimile device FF.

The transmission request message is transmitted following an appropriate path from the data terminal device DT through plural mail servers not shown in the figures in order, to the facsimile gateway device GF as its destination address.

The facsimile gateway device GF, in a case that a received email message is the transmission request message from the data terminal device DT, extracts the image information included in the transmission request message, and transmits the extracted image information to its destination address, in this case, the telephone number of the G3 facsimile device FF after calling the number.

The facsimile gateway device GF notifies the data terminal device DT after the G3 facsimile device FF receives the image information so that a user of the data terminal device DT is able to know whether the image information transmitted from the data terminal device DT is received by the G3 facsimile device FF.

The above-described method to confirm the delivery of the image information is referred to as the delivery confirmation method. This delivery confirmation method to confirm the delivery of the image information or an email message is regulated by a DSN (Delivery Status Notification) and a MDN (Message Disposition Notification).

It should be noted, hereinafter, a delivery-confirmation mail message regulated by the DSN is referred to as a DSN delivery-confirmation mail message, and a delivery-confirmation mail message regulated by the MDN is referred to as a MDN delivery-confirmation mail message.

According to the DSN regulated by a RFC 189 and a RFC 1894, a SMTP client such as the data terminal device DT requests a delivery confirmation to a SMTP server at a SMTP command level.

Figure 7:
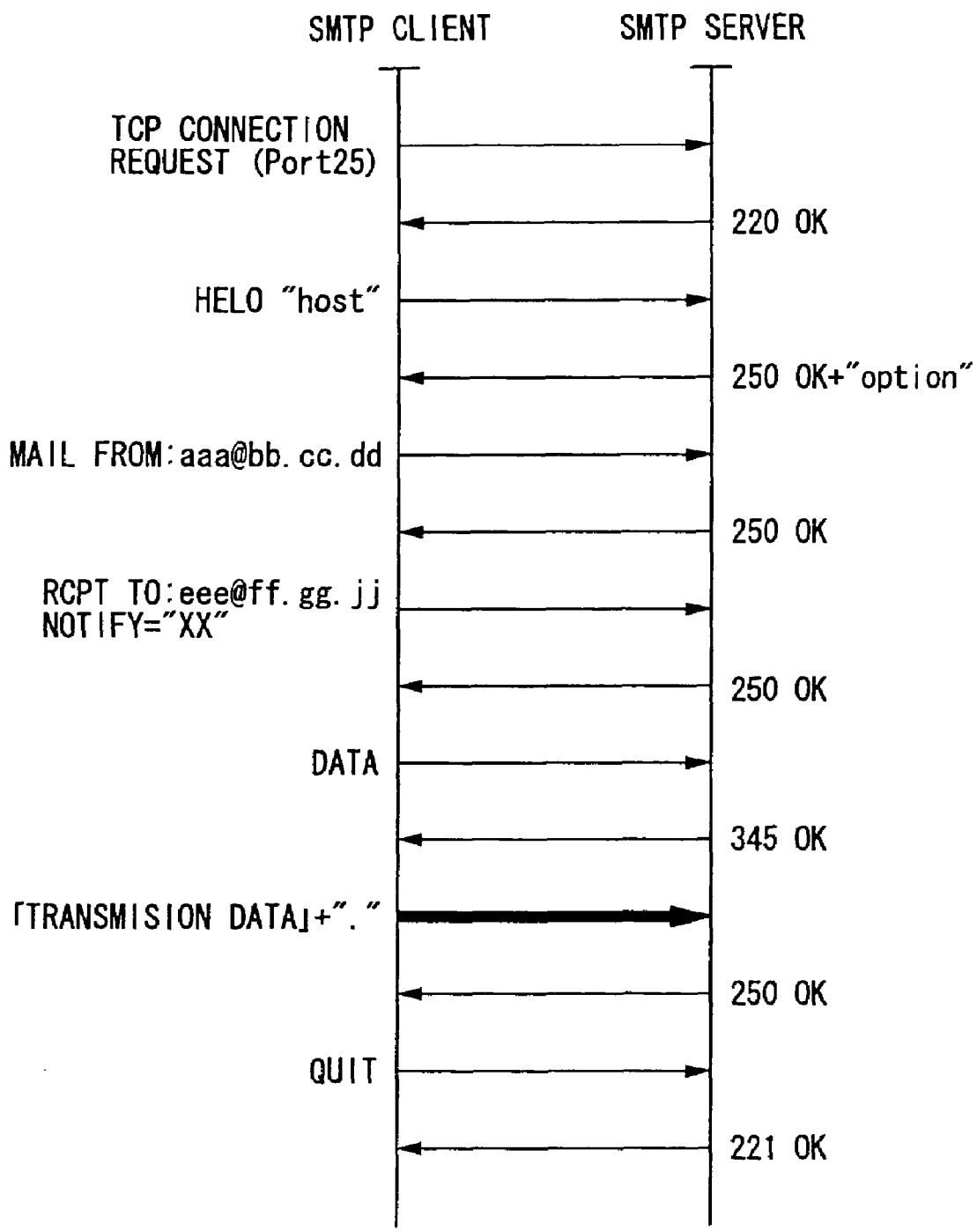
FIG. 7 is a time chart showing an example of a protocol used when requesting a DSN delivery confirmation between a SMTP client and a SMTP server.

FIG. 7 shows an example of a protocol that is applied between the SMTP client and the SMTP server when a delivery confirmation request by the DSN is processed between them. The facsimile gateway device GF according to the embodiment of the present invention includes a SMTP reception function equivalent to the SMTP server function, and is able to receive a SMTP command and the email message.

The SMTP client initially requests the SMTP server to establish a connection between them by use of a TCP port 25. The SMTP server sends a code "220" with an appropriate comment, in this case, "OK" to the SMTP client, wherein the code "220" indicates a connection request from the SMTP client is accepted.

Subsequently, the SMTP client sends a host name of its own terminal device to the SMTP server by using a command "HELO" followed by an argument "host" as the host name. After receiving the command HELO from the SMTP client, the SMTP server sends a code "250" and an appropriate option as a comment, for example, a server host name, to the SMTP client, wherein the code "250" indicates a command from the SMTP client, in this case, the command HELO is accepted by the SMTP server.

The SMTP client, after receiving the code "250", sends a command line "MAIL FROM: aaa@bb.cc.dd" notifying a sender's mail address to the SMTP server. The sender's mail address "aaa@bb.cc.dd" is set as the argument of a command "MAIL FROM:".

Subsequently, if the SMTP server receives the command line "MAIL FROM: aaa@bb.cc.dd" from the SMTP client, the SMTP server obtains the sender's mail address "aaa@bb.cc.dd" from the received command line, and checks a format of the sender's mail address. If the sender's mail address includes a character "@", the sender's mail address usually does not exist in the SMTP server's domain, and the SMTP server checks whether an address format of the sender's mail address is correct. If the sender's mail address does not include a character "@", the sender's mail address must exist in the SMTP server's domain, and the SMTP server checks whether the sender's mail address is registered to the SMTP server's domain. The SMTP server may check different elements such as an alias of the sender's mail address depending on a set up of the SMTP server.

If the SMTP server determines that the format of the sender's mail address is correct by taking the above-described steps, the SMTP server sends the code "250" and the comment "OK" that indicates the format of the sender's mail address is correct, to the SMTP client.

The SMTP client, after receiving the code "250" from the SMTP server, sends a command line "RCPT TO: eee@ff.gg.hh NOTIFY='XX'" to the SMTP server for notifying the destination mail address. The destination mail "eee@ff.gg.hh" is set as the argument of a command "RCPT TO:".

Additionally, a DSN command "NOTIFY='XX'" indicates that the SMTP client requests a delivery-confirmation mail message that corresponds to a value "XX" from the SMTP server. A value "SUCCESS" is set to the value "XX" if the SMTP client requests the delivery-confirmation mail message that notifies a successful mail delivery when the email message is delivered correctly to its destination address. A value "FAILURE" is set to the value "XX" if the SMTP client requests the delivery-confirmation mail message that notifies a mail delivery failure when the email message is not delivered correctly to its destination address. A value "SUCCESS, FAILURE" is set to the value "XX" if the SMTP client requests both the delivery-confirmation mail message that notifies a mail delivery failure and the delivery-confirmation mail message that notifies a successful mail delivery.

Additionally, a DSN delivery-confirmation mail message is transmitted to a mail address that is specified by a command "MAIL FROM:".

When the SMTP server receives the command line "RCPT TO: eee@ff.gg.hh NOTIFY='XX'" from the SMTP client, the SMTP server obtains the destination mail address "eee@ff.gg.hh" from the received command line, and checks a format of the destination mail address similarly as described above.

If it is ascertained by the SMTP server that the format of the destination mail address is correct, the SMTP server sends the code "250" and the comment "OK" to the SMTP client.

After connecting to the SMTP server and then checking the sender's mail address and the destination mail address as described above, the SMTP client sends a command DATA to the SMTP server for proceeding to a data phase. The SMTP server sends a code "345" indicating the command DATA is accepted by the SMTP server and the comment "OK" to the SMTP client after receiving the command DATA from the SMTP client.

Subsequently, the SMTP client sends a mail header and text information of the email message in order, to the SMTP server after receiving the code "345" therefrom. After sending the mail header and the text information of the email message, the SMTP client then sends a finishing code "." to the SMTP server.

When the SMTP server receives the finishing code "." from the SMTP client, the SMTP server checks whether it has received the mail header and the text information of the email message correctly. If the SMTP server receives the mail header and the text information of the email message correctly from the SMTP client, it sends the code "250" and the comment "OK" to the SMTP client.

Subsequently, the SMTP client sends a command QUIT to the SMTP server for notifying the end of the email message transmission. The SMTP server, after receiving the command QUIT from the SMTP client, starts transmitting the email message to the other SMTP client as the destination mail address, and sends a code "221" and the comment "OK" to the SMTP client.

After receiving the code "221" from the SMTP server, the SMTP client requests the SMTP server to disconnect the line between the SMTP server and the SMTP client.

The SMTP client transmits the email message to the SMTP server by taking the above-described steps.

Since the facsimile gateway device GF includes the SMTP reception function as described above, the device GF is able to receive SMTP commands from the data terminal device DT. Accordingly, the facsimile gateway device GF receives the command line "RCPT TO: eee@ff.gg.hh NOTIFY='XX'" from the data terminal device DT, and can determine whether the device DT requests the device GF to transmit the DSN delivery-confirmation mail message to the device DT, wherein the delivery-confirmation mail message corresponds to the transmission request message transmitted from the device DT to the device GF.

When receiving the DSN command line "RCPT TO: eee@ff.gg.hh NOTIFY='XX'" with the transmission request message from the data terminal device DT, the facsimile gateway device GF ascertains that the delivery confirmation for the received transmission request message is requested, and transmits the image information included therein to the specified destination address of the G3 facsimile device FF. The facsimile gateway device GF then creates the delivery-confirmation mail message that indicates the result of image-information transmission, and transmits the created delivery-confirmation mail message to the mail address notified by the command "MAIL FROM:".

Additionally, the delivery-confirmation mail message is created according to the value "XX" in the "NOTIFY='XX'". If the value "XX" is set to either "SUCCESS" or "SUCCESS, FAILURE", the facsimile gateway device GF creates the delivery-confirmation mail message as shown in FIG. 8 that indicates the success of the image-information transmission and transmits to the mail address notified by the command "MAIL FROM:" when the G3 facsimile device FF receives all the pages of the image information correctly.

The success of the image-information transmission is indicated by a sentence "Action: delivered" in the second MIME part of the delivery-confirmation mail message shown in FIG. 8.

In FIG. 8, a total number of delivered facsimile image information is notified in an extension field "X-Transmitted-NumberOfPage-To-Fax:" of the second MIME part of the delivery-confirmation mail message. In this case, a value of the extension field "X-Transmitted-NumberOfPage-To-Fax:" is set to "5" showing that the total number of the delivered facsimile image information is five.

Additionally, a communication charge of the image-information transmission (a telephone charge) is notified in an extension field "X-Charge-Information-To-Fax:" of the second MIME part of the delivery-confirmation mail message. In this case, a value of the extension field "X-Charge-Information-To-Fax:" is set to "¥100" showing that the communication charge is 100 yen.

The communication charge is calculated, for instance, by finding the time taken for the image-information transmission, and by calculating using a widely known communication charge calculating method based on the found time and the communication charge for each time unit between a calling end and a receiving end. Otherwise, the communication charge is calculated by multiplying the time taken for the image-information transmission and the communication charge for transmitting a page in a case that the communication charge for transmitting a page is predetermined.

If the value "XX" is set to either "FAILURES" or "SUCCESS, FAILURE", the facsimile gateway device GF creates the delivery-confirmation mail message as shown in FIG. 9 that indicates the failure of the image-information transmission and transmits to the mail address notified by the command "MAIL FROM:" when the G3 facsimile device FF fails to receive a page or more included in the image information.

The failure of the image-information transmission is indicated by a sentence "Action: failed" in the second MIME part of the delivery-confirmation mail message shown in FIG. 9. In this case, the contents of the transmission request message that requests the delivery-confirmation mail message is placed in the third MIME part of the delivery-confirmation mail message.

A description will now be given of the delivery confirmation method by the MDN to confirm the delivery of image information or an email message.

This MDN is regulated by a RFC 2298. The facsimile gateway device GF processes a delivery confirmation request by the MDN by use of a "Disposition-Notification-To:" field located in a mail header of the transmission request message from the data terminal device DT. A destination mail address of the delivery-confirmation mail message, for example, "user-d@jupiter.abcdcdb.co.jp" is set in the "Disposition-Notification-To:" field.

Accordingly, the facsimile gateway device GF ascertains that a delivery confirmation by the MDN is requested in a case that the "Disposition-Notification-To:" field is included in the mail header of a received transmission request message.

In the above-described case, the facsimile gateway device GF transmits the image information included in the received transmission request message to the destination address of the G3 facsimile device FF. Subsequently, the facsimile gateway device GF creates the delivery-confirmation mail message showing a result of the image-information transmission by a method regulated by the MDN, and transmits the created delivery-confirmation mail message to the mail address notified by the "Disposition-Notification-To:" field.

FIGS. 10A and 10B show one form of the MDN delivery-confirmation mail message that indicates the success of the image-information transmission. A sentence "Disposition: manual-action/MDN-sent-manually; displayed (or processed)" in the second MIME part of the delivery-confirmation mail message shows that the result of the image-information transmission is normal, in other words, the G3 facsimile device FF receives all the pages of the transmitted image information.

Additionally, a total number of delivered facsimile image information is notified in the extension field "X-Transmitted-NumberOfPage-To-Fax:" of the second MIME part of the delivery-confirmation mail message. A communication charge of the image-information transmission (a telephone charge) is notified in the extension field "X-Charge-Information-To-Fax:" of the second MIME part of the delivery-confirmation mail message.

The communication charge can be calculated by applying the same method as described above for the DSN mails.

If the G3 facsimile device FF cannot receive one or more pages, the facsimile gateway device GF creates the delivery-confirmation mail message that indicates the failure of the image-information transmission. In such case, a sentence "Disposition: manual-action/MDN-sent-manually; failed" is placed in the second MIME part of the delivery-confirmation mail message. Additionally, the extension fields "X-Transmitted-NumberOfPage-To-Fax:" and "X-Charge-Information-To-Fax:" are not placed in the second MIME part of the delivery-confirmation mail message.

As described above, in this embodiment of the present invention, when transmitting the image information through the facsimile gateway device GF to the G3 facsimile device FF by use of the transmission request message, a user of the data terminal device DT can receive the delivery-confirmation mail message notifying the result of the facsimile image-information transmission so as to clearly know the result of the facsimile image-information transmission, which is very convenient.

Figure 11A:
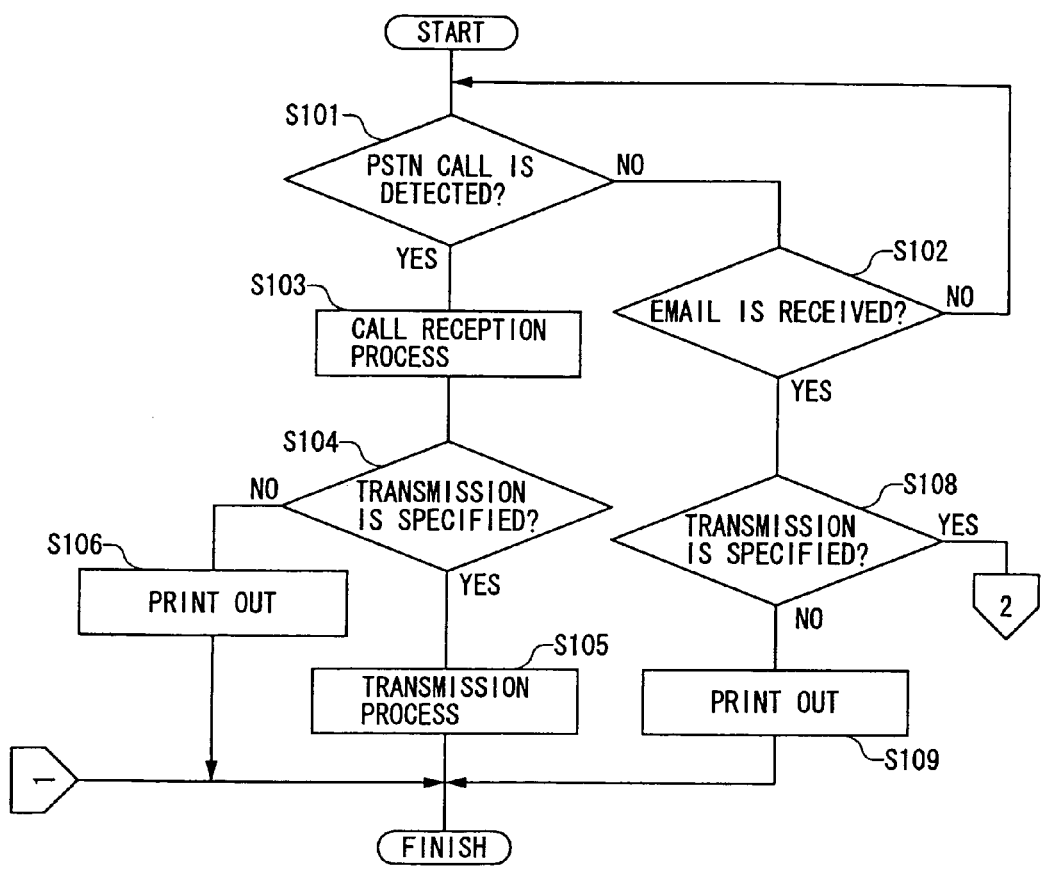
FIGS. 11A, 11B and 11C are flowcharts showing a first image-information transmission process taken by the facsimile gateway device GF in the first embodiment of the present invention.
Figure 11B:
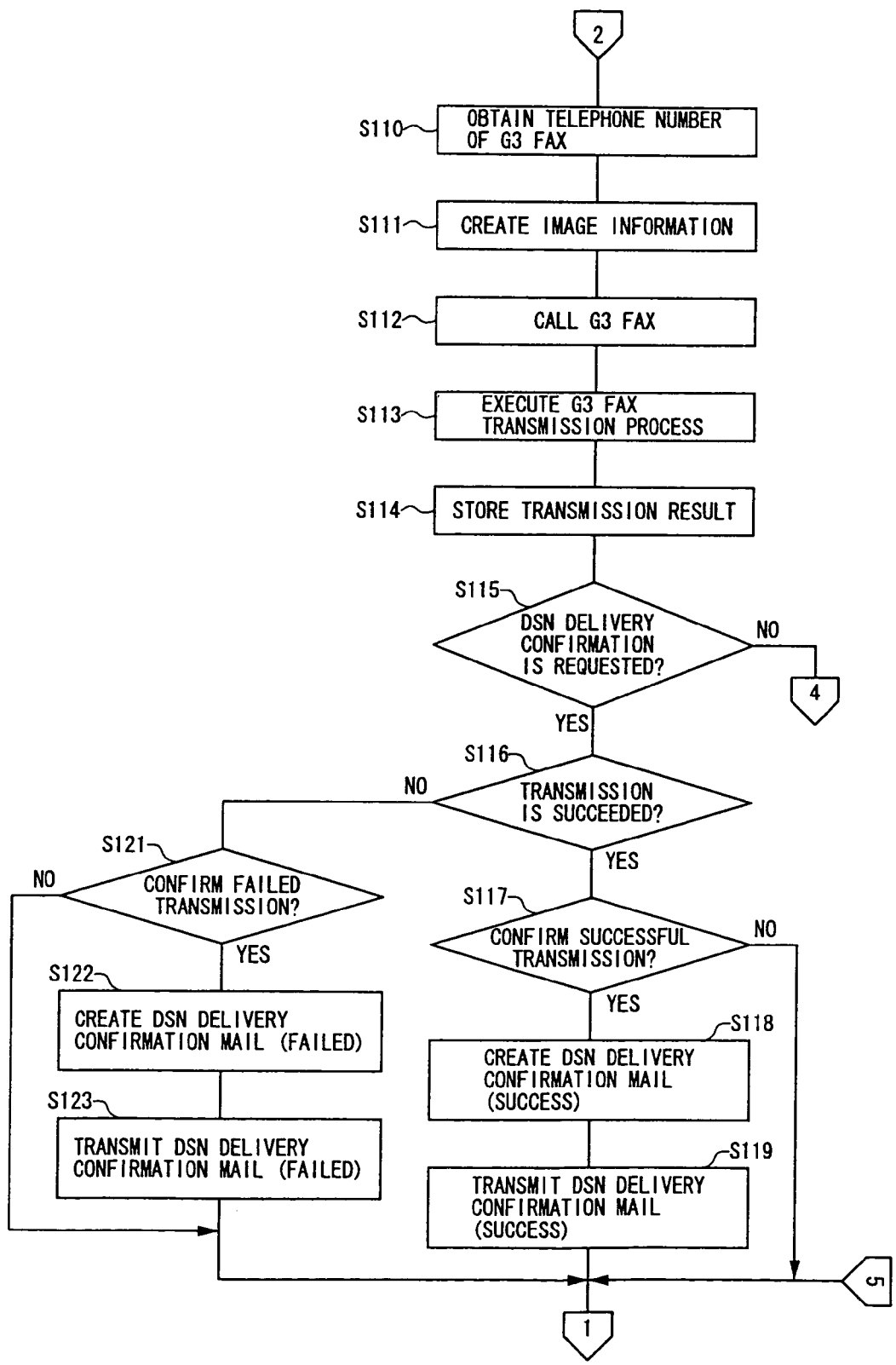
Figure 11C:
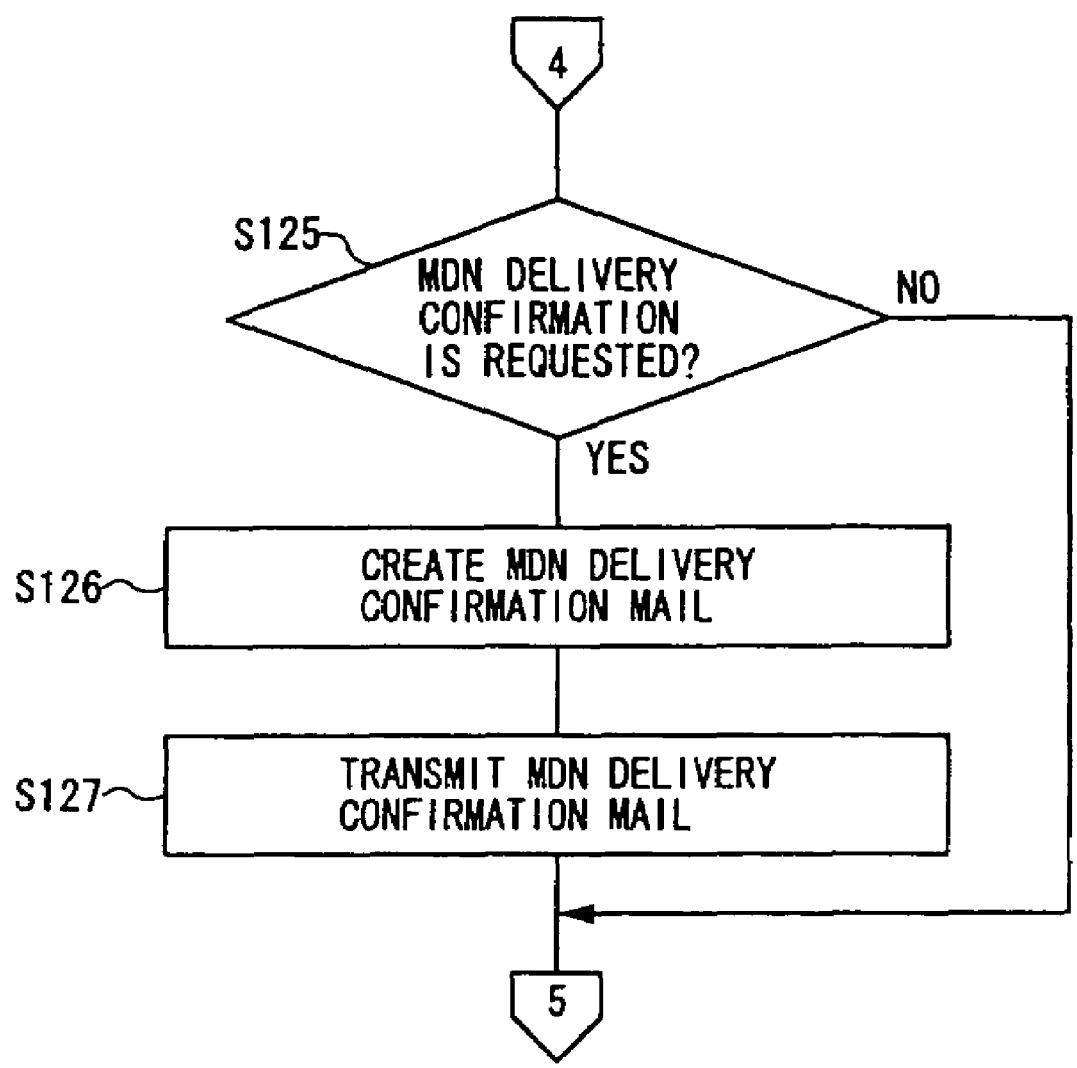

FIGS. 11A, 11B and 11C are flowcharts showing a first image-information transmission process taken by the facsimile gateway device GF in the first embodiment of the present invention.

The facsimile gateway device GF initially detects a reception of a call from the PSTN or an email message (NO at a step S101 and NO at a step S102).

In a case that the facsimile gateway device GF receives the call from the PSTN at the step S101, the device GF proceeds to a step S103. At the step S103, the device GF executes a fixed call reception process, receives image information by executing the G3 facsimile transmission procedure between the device GF and the G3 facsimile device FF, and stores the received image information therein.

The device GF checks whether a destination address of the image information is specified in order to transmit the received image information to a user of the data terminal device DT or the G3 facsimile device FF at a step S104. If it is ascertained at the step S104 that the destination address of the image information is specified, the device GF proceeds to a step S105 and executes a fixed transmission process that transmits the image information to the specified destination address. The device GF then terminates the image-information transmission process.

If it is ascertained at the step S104 that the destination address of the image information is not specified, the device GF prints out the stored image information at a step S106, and then terminates the image-information transmission process.

If the device GF receives an email message at the step S102, it checks whether the destination address of the image information is specified in the email message at a step S108. If it is ascertained at the step S108 that the destination address is not specified, the device GF extracts the image information from text information of the received email message, and prints out the extracted image information at a step S109. The device GF then terminates the image-information transmission process.

If it is ascertained at the step S108 that the destination address of the image information is specified, the email message received from the data terminal device DT by the device GF is a transmission request message. Accordingly, at a step S110, the device GF obtains a telephone number of the G3 facsimile device FF as the destination address of the image information from the received transmission request message. The device GF then creates the image information from the text information of the received transmission request message at a step S111. Subsequently, at a step S112, the device GF calls the telephone number obtained at the step S110. At a step S113, the device GF executes the fixed G3 facsimile transmission procedure and transmits the image information created at the step S111 to the destination address. The device GF then stores a result of the image-information transmission at a step S114. For instance, the device GF stores a result that indicates a successful transmission if the device GF receives the signal MCF for each page transmitted, and stores a result that indicates a failed transmission if the device GF does not receive the signal MCF for any page transmitted.

Additionally, when receiving the transmission request message, the device GF checks whether the transmission request message requests the delivery confirmation by the DSN at a step S115. If it is ascertained that the delivery confirmation by the DSN is requested at the step S115, the device GF checks whether the image-information transmission to the G3 facsimile device FF is completed without any errors at a step S116.

If it is ascertained at the step S116 that the image transmission is successfully completed, the device GF proceeds to a step S117, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURES" indicating that a confirmation of a successful delivery is requested, the device GF creates a DSN delivery-confirmation mail message that indicates the success of the transmission at a step S118, transmits the created DSN delivery-confirmation mail message to a mail address notified in the "MAIL FROM:" field at a step S119, and terminates the image-information transmission process. This DSN delivery-confirmation mail message includes the above-described extension field "X-Transmitted-NumberOfPage-To-Fax:" showing the total number of pages transmitted and the extension field "X-Charge-Information-To-Fax:" showing the communication charge for the transmission.

If the value of the "XX" is found to be "FAILURE" at the step S117, the device GF does not creates the DSN delivery-confirmation mail message, and terminates the image-information transmission process.

If it is ascertained at the step S116 that the image transmission is failed, the device GF proceeds to a step S121, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GF creates the DSN delivery-confirmation mail message that indicates the failure of the transmission at a step S122, transmits the created DSN delivery-confirmation mail message to the mail address notified in the "MAIL FROM:" field at a step S123, and terminates the image-information transmission process.

If the value of the "XX" is found to be "SUCCESS" at the step S121, the device GF does not creates the DSN delivery-confirmation mail message, and terminates the image-information transmission process.

If it is ascertained that the delivery confirmation by the DSN is not requested at the step S115, the device GF proceeds to a step S125, and checks whether the "Disposition-Notification-To:" field is included in the mail header of the received transmission request message. If it is ascertained at the step S125 that the "Disposition-Notification-To:" field is not included in the received transmission request message, the device GF determines that transmission request message does not request for the delivery confirmation by the MDN, and terminates the image-information transmission process.

If it is ascertained at the step S125 that the "Disposition-Notification-To:" field is included in the received transmission request message, the device GF creates a MDN delivery-confirmation mail message as described above that shows a result of the image-information transmission at a step S126, and transmits the created MDN delivery-confirmation mail message to a mail address specified in the "Disposition-Notification-To:" field at a step S127. If the transmitted MDN delivery-confirmation mail message indicates a successful transmission of the image information, the above-described extension field "X-Transmitted-NumberOfPage-To-Fax:" showing the total number of pages transmitted and the extension field "X-Charge-Information-To-Fax:" showing the communication charge for the transmission are included therein.

Figure 12:
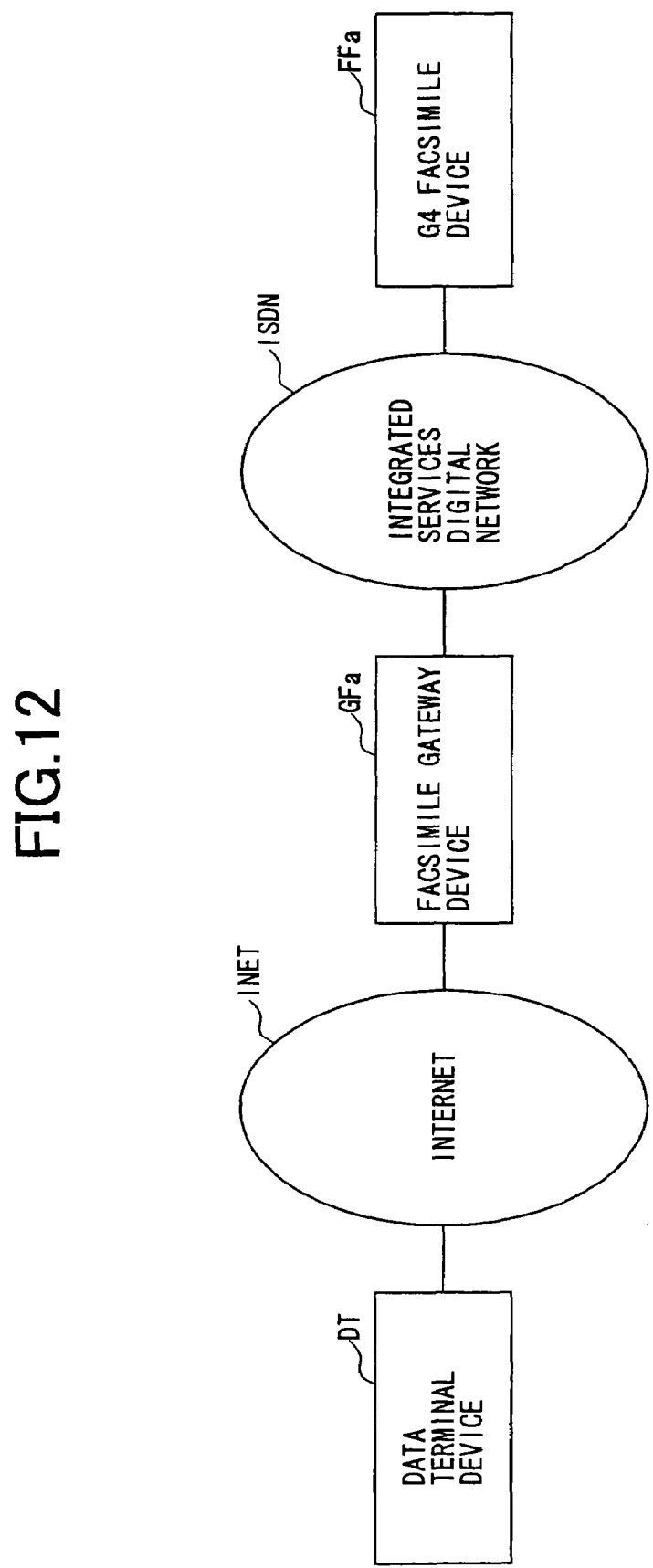
FIG. 12 is a schematic diagram of the facsimile communication system according to a second embodiment of the present invention.

FIG. 12 is a schematic diagram of the facsimile communication system according to a second embodiment of the present invention.

The facsimile communication system shown in FIG. 12 includes mainly a facsimile gateway device GFa, a data terminal device DT and a G4 facsimile device FFa. The facsimile gateway device GFa is an Internet facsimile gateway device that has accesses to the Internet and the ISDN. The data terminal device DT is connected to the Internet. The G4 facsimile device FFa is connected to the ISDN. The facsimile communication system makes it possible to exchange image information between the data terminal device DT and the G4 facsimile device FFa.

At a first step of transmitting image information to the G4 facsimile device FFa, the data terminal device DT creates a transmission request message that includes the image information in text information thereof, and transmits the created transmission request message to the facsimile gateway device GFa.

At the first step, the data terminal device DT also includes destination address information of the G4 facsimile device FFa, in this case, a telephone number of the G4 facsimile device FFa in the transmission request message. Subsequently, the data terminal device DT transmits the transmission request message to the facsimile gateway device GFa. The facsimile gateway device GFa then ascertains a received email message that includes the destination address information as the transmission request message, extracts the image information therefrom, and transmits the image information to the G4 facsimile device FFa by calling a destination address specified by the destination address information.

As described above, the image information is transmitted from the G4 facsimile device FFa-through the facsimile gateway device GFa to the data terminal device DT.

At a first step of transmitting the image information from the G4 facsimile device FFa to the data terminal device DT, the G4 facsimile device FFa calls the facsimile gateway device GFa. Subsequently, the G4 facsimile device FFa specifies a user mail address as the destination address of the image information, and transmits the image information to the facsimile gateway device GFa.

When the G4 facsimile device FFa calls the facsimile gateway device GFa and the mail address is specified as the destination address of the image information, the facsimile gateway device GFa stores the image information thereafter. The facsimile gateway device GFa then creates a delivery email message that includes the stored image information and the specified mail address, and transmits the created delivery email message following a transmission path to a mail server that is appropriate to the specified mail address.

Subsequently, the mail server transmits the delivery email message received from the facsimile gateway device GFa to the specified mail address. As described above, the image information is transmitted from the G4 facsimile device FFa through the facsimile gateway device GFa to the data terminal device DT.

The facsimile gateway device GFa is provided with a function to receive the email message, and can interpret a SMTP command directly from the received email message.

Figure 13:
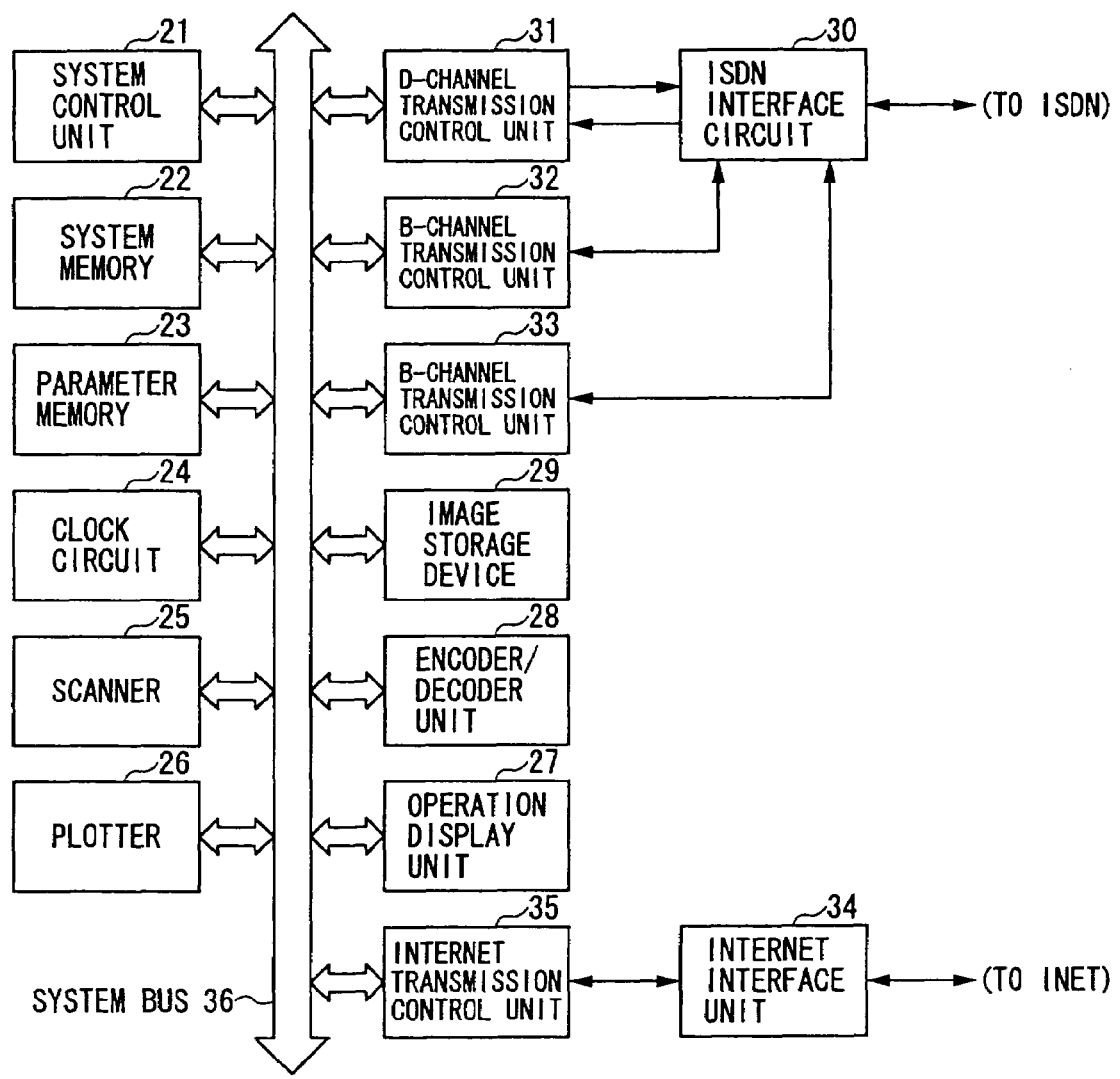
FIG. 13 is a block diagram showing components of a facsimile gateway device GFa in the second embodiment of the present invention.

FIG. 13 is a block diagram showing components of the facsimile gateway device GFa in the second embodiment of the present invention.

As shown in FIG. 13, the facsimile gateway device GFa includes a system control unit 21, a system memory 22, a parameter memory 23, a clock circuit 24, a scanner 25, a plotter 26, an operation display unit 27, an encoder/decoder unit 28, an image storage device 29, an ISDN interface circuit 30, a D-channel transmission control unit 31, B-channel transmission control units 32 and 33, an Internet interface unit 34, an Internet transmission control unit 35, and a system bus 36.

The system control unit 21 controls each unit in the facsimile gateway device GFa and executes control processes such as a facsimile transmission control process. The system memory 22 stores a control program executed by the system control unit 21 and data necessary for an execution of the control program, and is used as a working area for the system control unit 21. The parameter memory 23 stores various types of information peculiar to the facsimile gateway device GFa. The clock circuit 24 outputs current time information.

The scanner 25 reads a manuscript image with a fixed resolution. The plotter 26 prints out an image with a fixed resolution. The operation display unit 27 includes all types of operation keys and indicators for operating the facsimile gateway device GFa.

The encoder/decoder unit 28 encodes and compresses an image signal, and also decodes and expands an encoded image signal back to an original image signal. The image storage unit 29 stores encoded image information.

The ISDN interface circuit 30 that connects the facsimile gateway device GFa to the ISDN has a function to process a layer 1 signal and a function to combine or separate a D-channel (a signal channel) signal and a B-channel (a information channel) signal. The D-channel transmission control unit 31 executes a signal processing on the D-channel of the ISDN such as a call establishment/disestablishment process. The B-channel transmission control units 32 and 33 execute a G4 facsimile transmission process on the B-channel of the ISDN.

The Internet interface circuit 34 connects the facsimile gateway device GFa to the Internet INET. The Internet transmission control unit 35 executes a communication control process by using a variety of fixed protocol suites for exchanging data with other data terminal devices through the Internet INET. For instance, the Internet transmission control unit 35 executes Send/receive processes of the email message.

The system bus 36 connects the system control unit 21, the system memory 22, the parameter memory 23, the clock circuit 24, the scanner 25, the plotter 26, the operation display unit 27, the encoder/decoder unit 28, the image storage device 29, the D-channel transmission control unit 31, the B-channel transmission control units 32 and 33, and the Internet transmission control unit 35 together. A data exchange among each unit in the facsimile gateway device GFa is processed mainly through the system bus 36.

Figure 14:
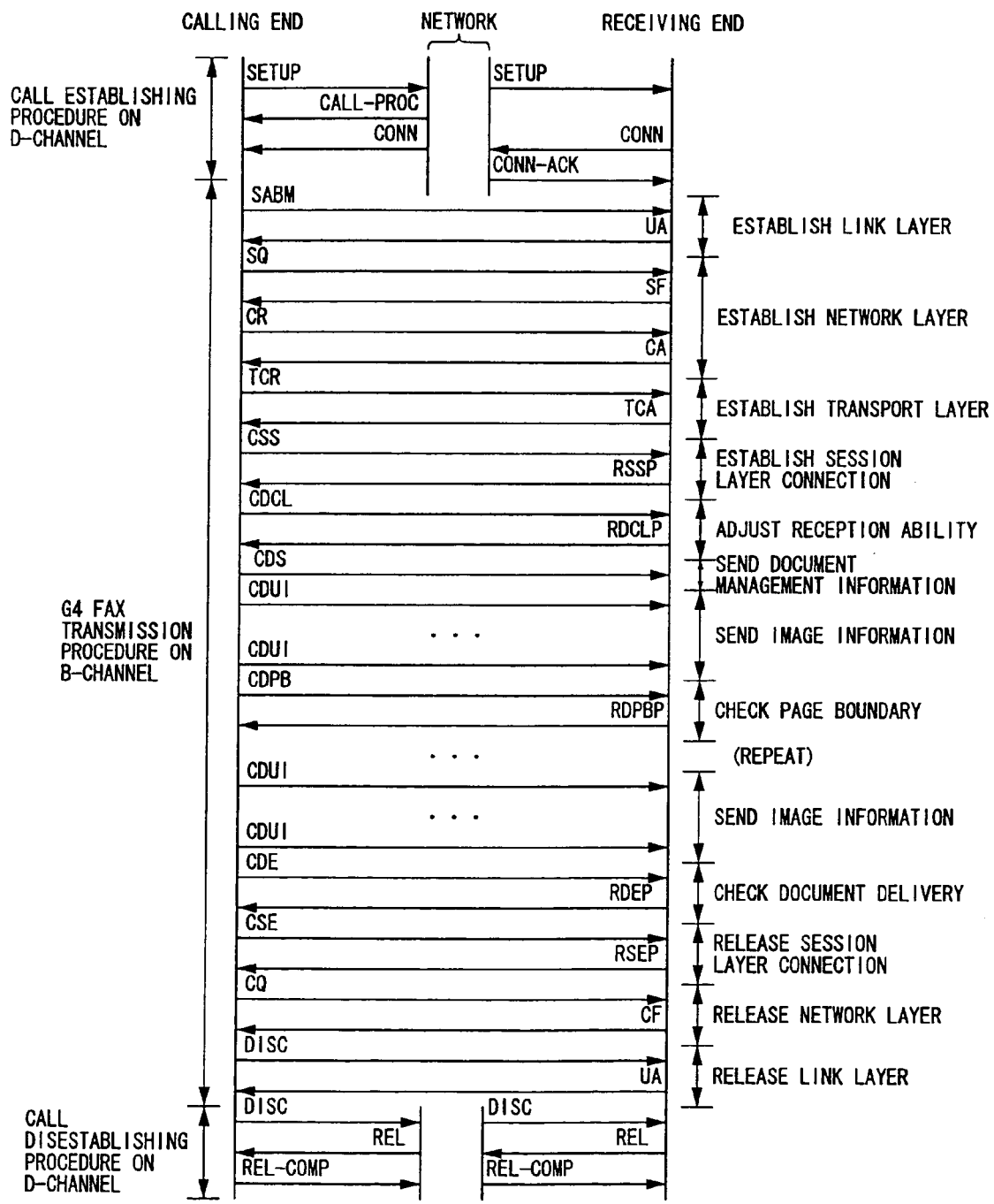
FIG. 14 is a time chart showing the image-information transmission procedure taken by a G4 facsimile device.

FIG. 14 shows the image-information transmission procedure taken by the G4 facsimile device FFa. This transmission procedure is taken for a transmission of the image information between the G4 facsimile device FFa and the facsimile gateway device GFa.

The G4 facsimile device FFa as a calling end sends a call establishment message SETUP to the ISDN with its destination address specified to an address of another G4 facsimile device on a receiving end, and requests a call establishment between the calling end and the receiving end. Receiving the message SETUP from the calling end, the ISDN sends a call establishment acceptance message CALL_PROC that notifies a condition of the call establishment to the calling end, and calls the receiving end by sending the call establishment message SETUP to a specified destination address of the receiving end.

After receiving the call establishment message SETUP, the receiving end sends a message CONN accepting the call establishment request by the calling end to the ISDN. The ISDN sends the message CONN to the calling end, and a message CONN_ACK to the receiving end acknowledging the reception of the message CONN. By taking the above-described steps, the B-channel (the information channel) is established for transmitting data between the calling end and the receiving end. Subsequently, the calling end and the receiving end start a data transmission procedure as follows.

At a first step in the data transmission procedure, the calling end sends a command SABM requesting an establishment of a link layer to the receiving end, and then the receiving end sends a response UA to the calling end. Consequently, the link layer is established between the calling end and the receiving end.

The calling end then sends a signal SQ for establishing a network layer, and then the receiving end sends a signal SF to the for accepting the signal SQ. Subsequently, the calling end sends a signal CR to the receiving end for a call request. The receiving end then sends a signal CA to the calling end accepting the call from the calling end. Accordingly, a network layer is established between the calling end and the receiving end.

Additionally, the calling end sends a signal TCR to the receiving end, and then the receiving end sends a signal TCA as a response to the signal TCR to the calling end. Accordingly, a transport layer is established between the calling end and the receiving end.

At the next step, the calling end sends a session starting command CSS to the receiving end, and then the receiving end sends a response RSSP acknowledging a start of a session to the calling end. Accordingly, a session layer connection is established between the calling end and the receiving end.

The calling end sends a document function list command CDCL to the receiving end for negotiating a transmission function to be used. Subsequently, the receiving end sends a response RDCLP acknowledging a document function list to the calling end. Accordingly, a reception ability of the receiving end is adjusted.

After a preparation for image-information transmission is completed as described above, the calling end sends the image information included in a single document to the receiving end by sending a document starting command CDS and then plural document user information commands CDUI. The command CDS is provided with a variety of information used for managing document information such as a document reference number used for distinguishing documents to be transmitted. When a transmission of the document is completed, the calling end sends a signal CDE notifying the image information is successfully transmitted to the receiving end.

The receiving end receives the signal CDE, and sends a response RDEP indicating the reception of the image information is successful to the calling end.

In a case that the document wherein the image information is attached includes plural pages, the calling end sends a document page boundary command CDPB to the receiving end indicating that a transmission of a page is completed at each time the transmission of a page except the last one of the image information is completed. The receiving end sends a response RDPBP to the calling end acknowledging a successful page reception after each successful transmission of the page.

After completing the transmission of the image information attached to the document as described above, the calling end sends a session finishing command CSE to the receiving. In response to the signal CSE, the receiving end sends a response RSEP to the calling end acknowledging the end of the session, and releases the session layer connection that is established between the calling end and the receiving end.

Additionally, the calling end sends a network layer signal CQ, and the receiving end sends a signal CF correspondingly to the calling end. Accordingly, the network layer is released. Additionally, the calling end sends a link layer command DISC to the receiving end, and the receiving end sends the response UA to the calling end. Accordingly, the link layer is released.

After the links on the B-channel are released as described above, the calling end sends a disconnecting message DISC to the ISDN requesting a release of the B-channel (the information channel). The ISDN sends a releasing message REL to the calling end notifying the release of the information channel, and the disconnecting message DISC to the receiving end requesting the release of the information channel.

Subsequently, the receiving end sends the releasing message REL to the ISDN notifying the release of the information channel.

The calling end sends a release-completing message REL_COMP indicating a completion of releasing the information channel to the ISDN. Accordingly, the information channel between the calling end and the ISDN is released. Additionally, the ISDN sends the release-completing message REL_COMP to the receiving end. Accordingly, the information channel between the ISDN and the receiving end is released. The information channel established between the calling end and the receiving end is then completely released.

As described above, the transmission procedure of the image information taken by the G4 facsimile device FFa includes the steps of establishing the information channel between the calling end and the receiving end, transmitting data between them, and releasing the established information channel after the data transmission is completed.

Figure 15A:
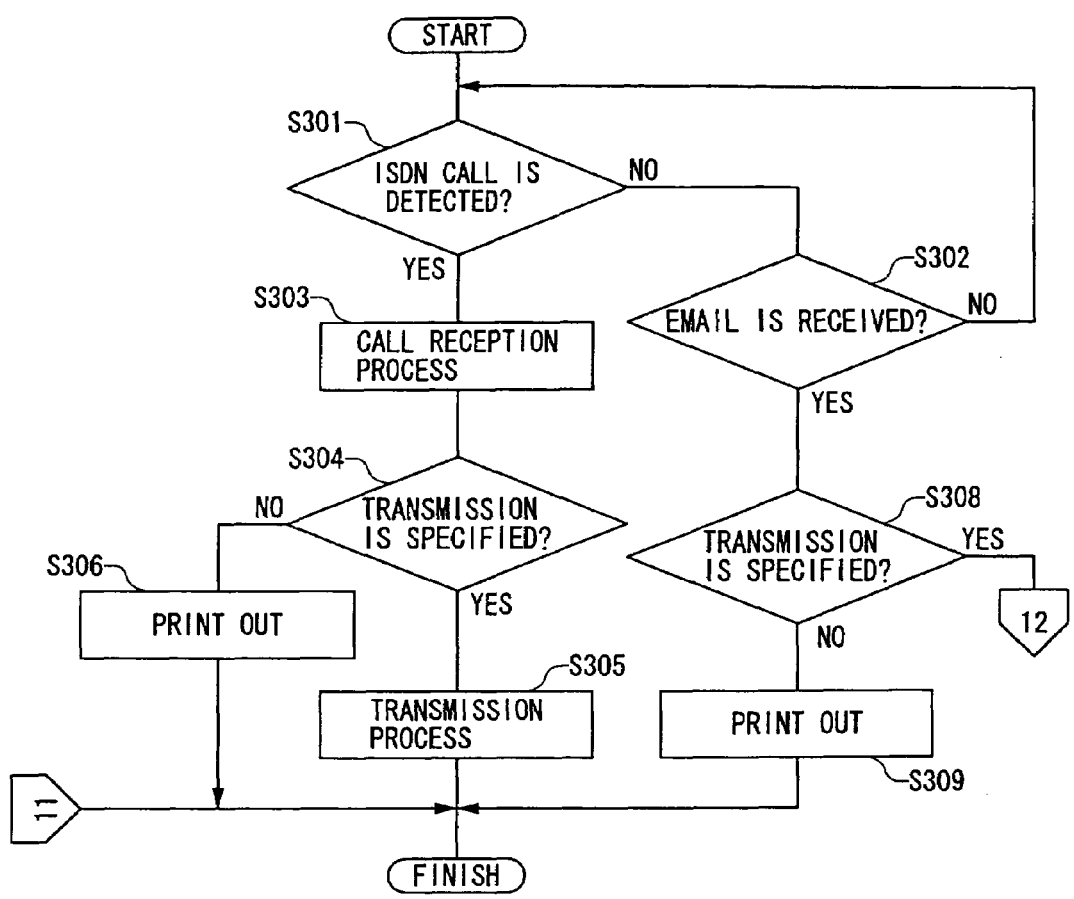
FIGS. 15A, 15B and 15C are flowcharts showing a first image-information transmission process taken by the facsimile gateway device GFa in the second embodiment of the present invention.
Figure 15B:
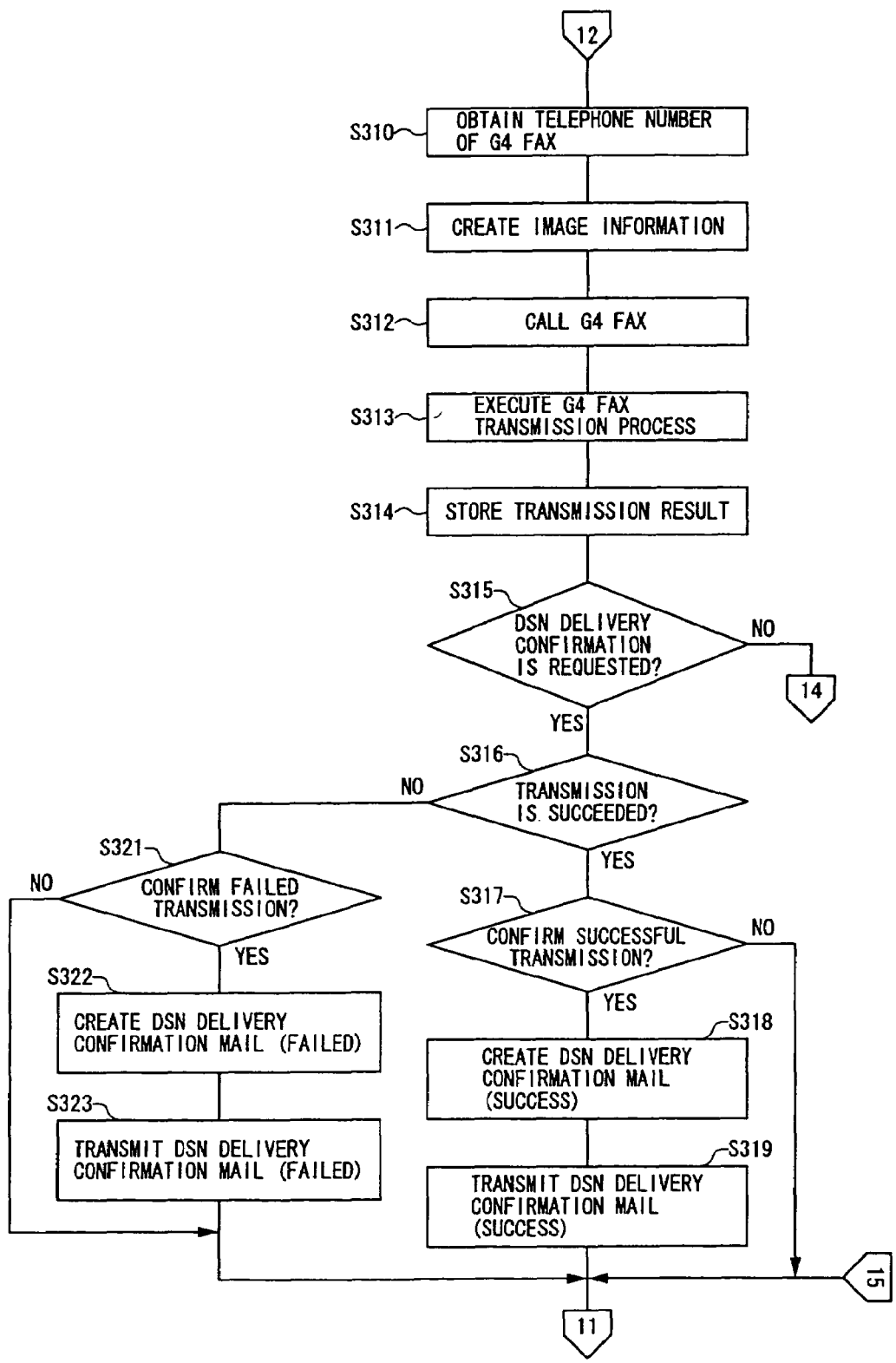
Figure 15C:
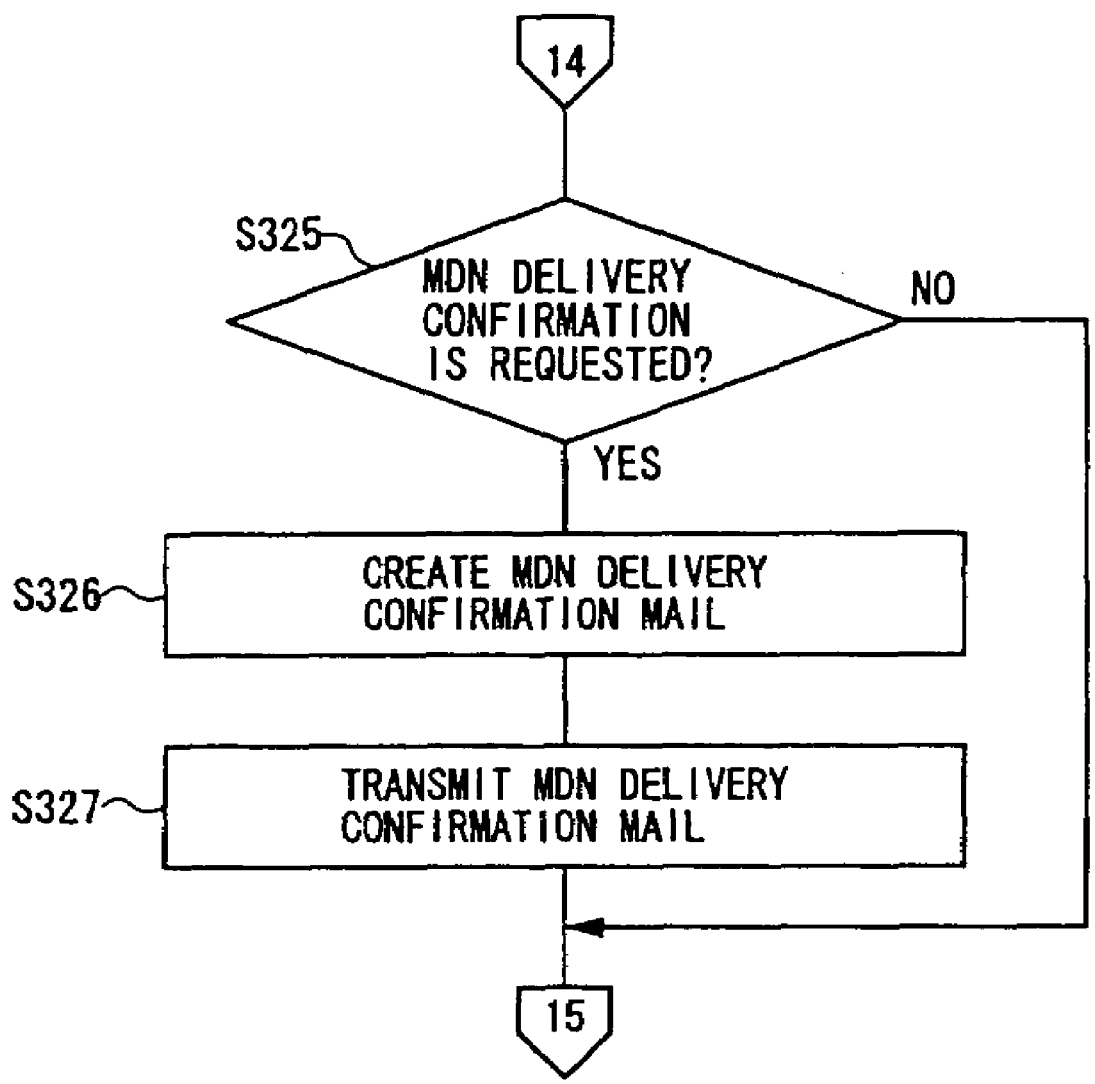

FIGS. 15A, 15B and 15C are flowcharts showing a first image-information transmission process taken by the facsimile gateway device GFa in the second embodiment of the present invention.

The facsimile gateway device GFa initially detects a reception of a call from the ISDN or an email message (NO at a step S301 and NO at a step S302).

In a case that the facsimile gateway device GFa receives the call from the ISDN at the step S301, the device GFa proceeds to a step S303. At the step S303, the device GFa executes a fixed call reception process, receives image information by executing the G4 facsimile transmission procedure between the device GFa and the G4 facsimile device FFa, and stores the received image information therein.

The device GFa checks whether a destination address of the image information is specified in order to transmit the received image information to a user of the data terminal device DT or the G4 facsimile device FFa at a step S304. If it is ascertained at the step S304 that the destination address of the image information is specified, the device GFa proceeds to a step S305 and executes a fixed transmission process that transmits the image information to the specified destination address. The device GFa then terminates the image-information transmission process.

If it is ascertained at the step S304 that the destination address of the image information is not specified, the device GFa prints out the stored image information at a step S306, and then terminates the image-information transmission process.

If the device GFa receives an email message at the step S302, it checks whether the destination address is specified in the email message at a step S308. If it is ascertained at the step S308 that the destination address is not specified, the device GFa extracts the image information from text information of the received email message, and prints out the extracted image information at a step S309. The device GFa then terminates the image-information transmission process.

If it is ascertained at the step S308 that the destination address of the image information is specified, the email message received from the data terminal device DT by the device GFa is a transmission request message. Accordingly, at a step S310, the device GFa obtains a telephone number of the G4 facsimile device FFa as the destination address of the image information from the received transmission request message. The device GFa then creates the image information from the text information of the received transmission request message at a step S311. Subsequently, at a step S312, the device GFa calls the telephone number obtained at the step S310. At a step S313, the device GFa executes the fixed G4 facsimile transmission procedure and transmits the image information created at the step S311 to the destination address. The device GFa then stores a result of the image-information transmission at a step S314. For instance, the device GFa stores a result that indicates a successful transmission if the device GFa receives the signal RDPBP or the signal RDEP for each page transmitted, and stores a result that indicates a failed transmission if the device GFa does not receive the signal RDPBP or the signal RDEP for any page transmitted.

Additionally, when receiving the transmission request message, the device GFa checks whether the transmission request message requests the delivery confirmation by the DSN at a step S315. If it is ascertained that the delivery confirmation by the DSN is requested, the device GFa also checks whether the image-information transmission to the G4 facsimile device FFa is completed without any errors at a step S316.

If it is ascertained at the step S316 that the image transmission is successfully completed, the device GFa proceeds to a step S317, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURE" indicating that a confirmation of a successful delivery is requested, the device GFa creates a DSN delivery-confirmation mail message that indicates the success of the transmission at a step S318, transmits the created DSN delivery-confirmation mail message to a mail address notified in the "MAIL FROM:" field at a step S319, and terminates the image-information transmission process. This DSN delivery-confirmation mail message includes the above-described extension field "X-Transmitted-NumberOfPage-To-Fax:" showing the total number of pages transmitted and the extension field "X-Charge-Information-To-Fax:" showing the communication charge for the transmission. In this case, the ISDN notifies the telephone charge to the device GFa so that the telephone charge notified by the ISDN can be used as the communication charge for the transmission.

If the value of the "XX" is found to be "FAILURE" at the step S317, the device GFa does not creates the DSN delivery-confirmation mail message, and terminates the image-information transmission process.

If it is ascertained at the step S316 that the image transmission is failed, the device GFa proceeds to a step S321, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GFa creates the DSN delivery-confirmation mail message that indicates the failure of the transmission at a step S322, transmits the created DSN delivery-confirmation mail message to the mail address notified in the "MAIL FROM:" field at a step S323, and terminates the image-information transmission process.

If the value of the "XX" is found to be "SUCCESS" at the step S321, the device GFa does not creates the DSN delivery-confirmation mail message, and terminates the image-information transmission process.

If it is ascertained that the delivery confirmation by the DSN is not requested at the step S315, the device GFa proceeds to a step S325, and checks whether the "Disposition-Notification-To:" field is included in the mail header of the received transmission request message. If it is ascertained at the step S325 that the "Disposition-Notification-To:" field is not included in the received transmission request message, the device GFa determines that transmission request message does not request for the delivery confirmation by the MDN, and terminates the image-information transmission process.

If it is ascertained at the step S325 that the "Disposition-Notification-To:" field is included in the received transmission request message, the device GFa creates a MDN delivery-confirmation mail message as described above that shows a result of the image-information transmission at a step S326, and transmits the created MDN delivery-confirmation mail message to a mail address specified in the "Disposition-Notification-To:" field at a step S327. If the transmitted MDN delivery-confirmation mail message indicates a successful transmission of the image information, the above-described extension field "X-Transmitted-NumberOfPage-To-Fax:" showing the total number of pages transmitted and the extension field "X-Charge-Information-To-Fax:" showing the communication charge for the transmission are included therein.

Additionally, any information useful to a user may be included in the delivery-confirmation mail message. For instance, a communication ending time is notified by the ISDN, and is included in a "Last-Attempt-Date:" field of the second MIME part of the delivery-confirmation mail message shown in FIG. 8.

As described above, in this embodiment of the present invention, when transmitting the image information through the facsimile gateway device GFa to the G4 facsimile device FFa by use of the transmission request message, a user of the data terminal device DT can receive the delivery-confirmation mail message notifying the result of the facsimile image-information transmission so as to clearly know the result of the facsimile image-information transmission, which is very convenient.

When transmitting image information to the G3 facsimile device FF, the facsimile gateway device GF is notified by the device FF reception abilities of the device FF including paper sizes, resolutions and encoding methods of image data that are receivable by the device FF from the facsimile gateway device GF as well as types of modems, modem speeds, optional transmission functions that are usable by the device FF.

Accordingly, it is expected to transmit image information efficiently by storing the reception ability of the G3 facsimile device FF in the facsimile gateway device GF for each destination address, in a case that the device GF transmits the image information to a specific destination address for the first time, and then refers to the stored reception ability when transmitting the image information to the destination address from the second time.

Additionally, a user can transmit image information with a high image quality by referring to the reception ability of the G3 facsimile device FF such as applicable paper sizes and acceptable resolutions when creating the image information.

In order to achieve the above-described efficient image-information transmission, a reception ability table shown in FIG. 16A is created in the facsimile gateway device GF storing reception ability information for each destination address, each G3 facsimile device FF, whereto the image information is transmitted. The reception ability information for a destination address includes a telephone number of the G3 facsimile device FF and elements of the reception ability of the G3 facsimile device FF as shown in FIG. 16B.

As shown in FIG. 17, the reception ability information of the G3 facsimile device FF at a receiving end is recorded in a single part of a DSN delivery-confirmation mail message so that a user of the data terminal device DT at a calling end is notified by the DSN delivery-confirmation mail message about the reception ability information of the G3 facsimile device FF.

In the above-described case, an "Action: dispatched" placed in the second part of the DSN delivery-confirmation mail message indicates that the image-information transmission to a destination address "Final-Recipient: RFC822; Fax=+81-3-9876-5432@jupiter" is succeeded. The reception ability information of the destination address is shown in a "Media-Accept-Features:" field located in the second part of the DSN delivery-confirmation mail message.

In the shown "Media-Accept-Features:" field, the acceptable resolution is 200×100 dpi/200×200 dpi, the acceptable encoding method is MH/MR/MMR, and the paper size is A4/B4.

Using extension fields shows other abilities of the facsimile device FF.

For instance, a line "X-C3Fax-JM: V. 34, V. 17, V. 29, V. 27ter" shows a modem support ability of the facsimile device FF when using an advice V. 8/V. 34 modem. A V. 8 modem procedure starts when a receiving end, the facsimile device FF, sends the signal CED to a calling end, the facsimile gateway device GF. Subsequently, a modem function to be used is notified to the calling end by a signal JM, and then an advice V. 34 modem training procedure is executed. Consequently, the modem speed applied between the calling end and the receiving end is determined.

Additionally, a line "X-G3Fax-INTERNET: T.37 simple mode" shows an ability of the receiving end to connect to the Internet. This ability information is obtained from a bit 1 in the signal DIS that received from the receiving end.

Additionally, a line "X-G3Fax-CSA: kilo@medaka.pole.co.jp" shows a destination mail address. This ability information is also obtained from a bit 1 in the signal DIS received from the receiving end. The data terminal device DT can transmit image information to the G3 facsimile device FF by sending the email message including the image information to the destination mail address. Types and contents of the above-described extension fields may be altered to match the needs for the image-information transmission.

The reception ability of the G3 facsimile device FF may be notified to a user of the data terminal device DT by use of a MDN delivery-confirmation mail message as well as use of a DSN delivery-confirmation mail message. FIG. 18 shows the MDN delivery-confirmation mail message including the reception ability of the G3 facsimile device FF.

In the MDN-delivery-confirmation mail message, a line "Disposition: manual-action/MDN-sent-manually; dispatched" indicates that the image information is transmitted successfully to a destination address "Final-Recipient: RFC822; Fax=+81-3-9876-5432@jupiter". Additionally, the reception ability of the destination address, the G3 facsimile device FF may be recorded similarly to the above-described "Media-Accept-Features:" field in the DSN delivery-confirmation mail message. Additionally, extension fields in the MDN delivery-confirmation mail message are same as those of the DSN delivery-confirmation mail message.

Figure 19A:
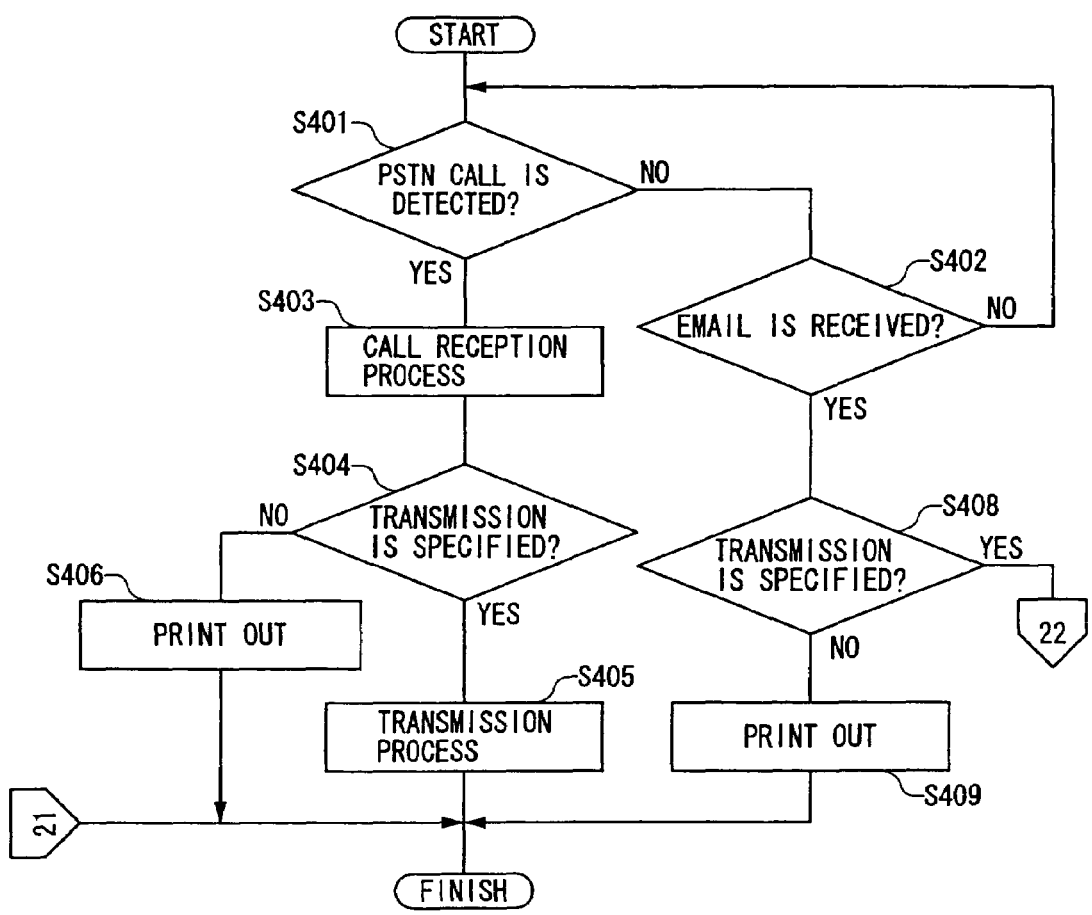
FIGS. 19A, 19B and 19C are flowcharts showing a second image-information transmission process taken by the facsimile gateway device GF in the first embodiment of the present invention.
Figure 19B:
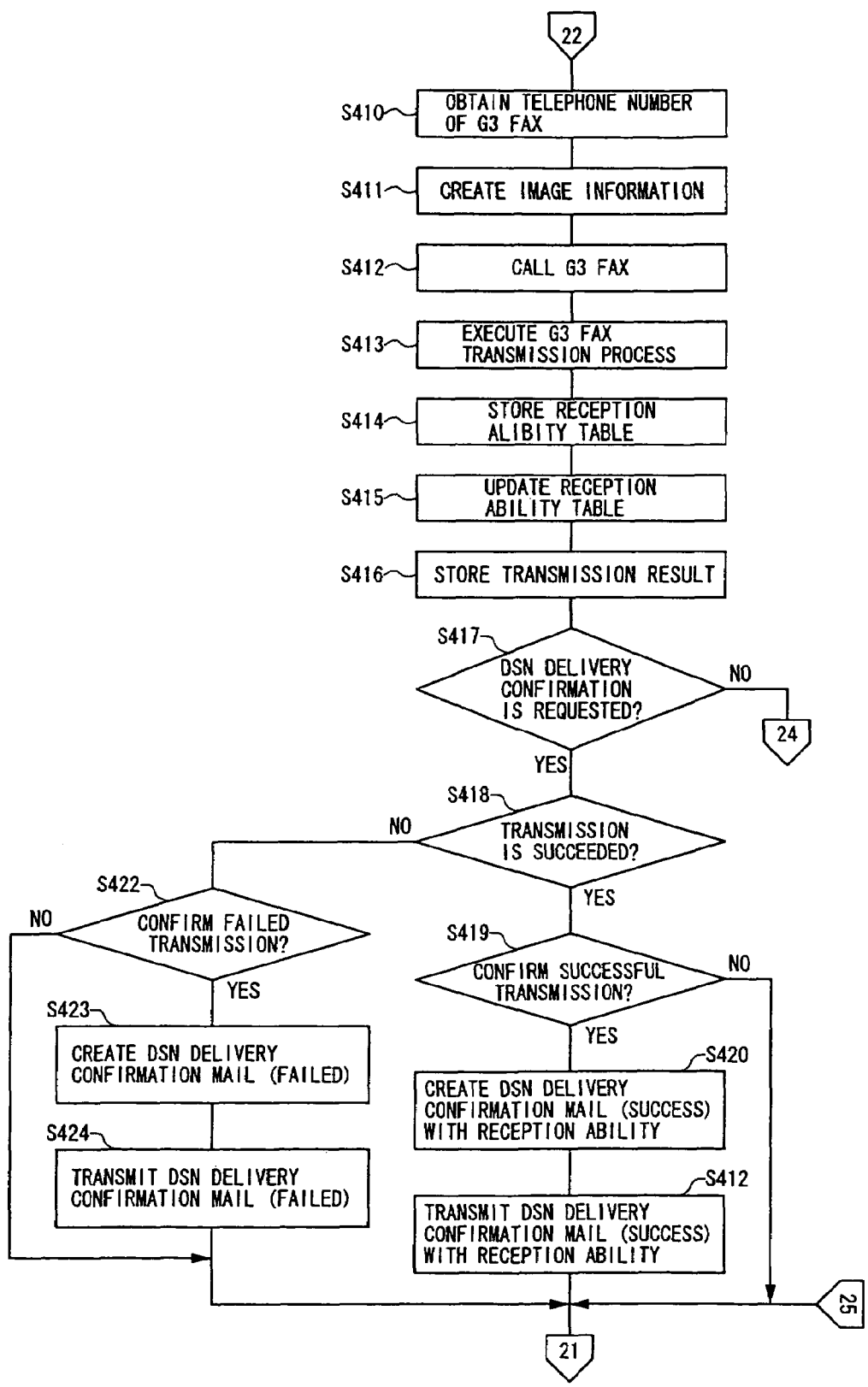
Figure 19C:
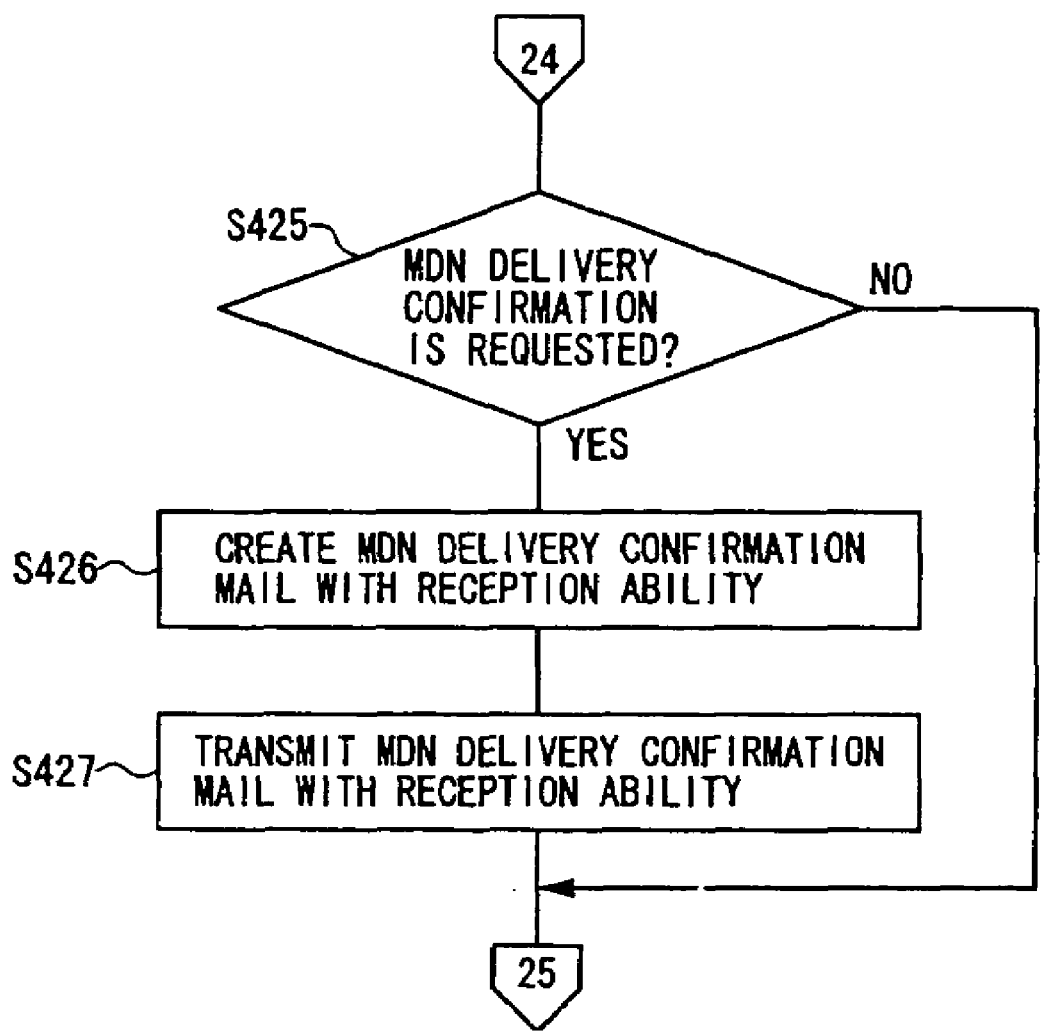

FIGS. 19A, 19B and 19C are flowcharts showing a second image-information transmission process taken by the facsimile gateway device GF in the first embodiment of the present invention, wherein the reception ability of the G3 facsimile device is notified to the data terminal device DT by use of the delivery-confirmation mail message.

The facsimile gateway device GF initially detects a reception of a call from the PSTN or an email message (NO at a step S401 and NO at a step S402).

In a case that the facsimile gateway device GF receives the call from the PSTN at the step S401, the device GF proceeds to a step S403. At the step S403, the device GF executes a fixed call reception process, receives image information by executing the G3 facsimile transmission procedure between the device GF and the G3 facsimile device FF, and stores the received image information therein.

The device GF checks whether a destination address of the image information is specified in order to transmit the received image information to a user of the data terminal device DT or the G3 facsimile device FF at a step S404. If it is ascertained at the step S404 that the destination address of the image information is specified, the device GF proceeds to a step S405 and executes a fixed transmission process that transmits the image information to the specified destination address. The device GF then terminates the image-information transmission process.

If it is ascertained at the step S404 that the destination address of the image information is not specified, the device GF prints out the stored image information at a step S406, and then terminates the image-information transmission process.

If the device GF receives an email message at the step S402, it checks whether the destination address of the image information is specified in the email message at a step S408. If it is ascertained at the step S408 that the destination address is not specified, the device GF extracts the image information from text information of the received email message, prints out the extracted image information at a step S409, and then terminates the image-information transmission process.

If it is ascertained at the step S408 that the destination address of the image information is specified, the email message received mail from the data terminal device DT by the device GF is a transmission request. Accordingly, at a step S410, the device GF obtains a telephone number of the G3 facsimile device FF as the destination address of the image information from the received transmission request message. The device GF then creates the image information from the text information of the received transmission request message at a step S411. Subsequently, at a step S412, the device GF calls the telephone number obtained at the step S410. At a step S413, the device GF executes the fixed G3 facsimile transmission procedure and transmits the image information created at the step S411 to the destination address. At a step S414, the device GF then records, on the reception ability table, a reception ability of the G3 facsimile device FF obtained from the G3 facsimile device FF as the destination address during the image-information transmission. Subsequently, the device GF updates the reception ability table at a step S415.

The device GF then stores a result of the image-information transmission at a step S416. For instance, the device GF stores a result that indicates a successful transmission if the device GF receives the signal MCF for each page transmitted, and stores a result that indicates a failed transmission if the device GF does not receive the signal MCF for any page transmitted.

Additionally, when receiving the transmission request message, the device GF checks whether the transmission request message requests the delivery confirmation by the DSN at a step S417. If it is ascertained that the delivery confirmation by the DSN is requested, the device GF also checks whether the image-information transmission to the G3 facsimile device FF is completed without any errors at a step S418.

If it is ascertained at the step S418 that the image transmission is successfully completed, the device GF proceeds to a step S419, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURE" indicating that a confirmation of a successful delivery is requested, at a step S420, the device GF creates a DSN delivery-confirmation mail message that indicates the successful transmission and includes information about the reception ability of the G3 facsimile device FF stored at the step S414. Subsequently, the device GF transmits the created DSN delivery-confirmation mail message to a mail address notified in the "MAIL FROM:" field at a step S421, and terminates the image-information transmission process.

If the value of the "XX" is found to be "FAILURE" at the step S419, the device GF does not creates the DSN delivery-confirmation mail message, and terminates the image-information transmission process.

If it is ascertained at the step S418 that the image transmission is failed, the device GF proceeds to a step S422, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GF creates the DSN delivery-confirmation mail message that indicates the failed transmission at a step S423, transmits the created DSN delivery-confirmation mail message to the mail address notified in the "MAIL FROM:" field at a step S424, and terminates the image-information transmission process. It should be noted that the DSN delivery-confirmation mail message that indicates the failed transmission may include information about the reception ability of the G3 facsimile device FF.

If the value of the "XX" is found to be "SUCCESS" at the step S422, the device GF does not creates the DSN delivery-confirmation mail message, and terminates the image-information transmission process.

If it is ascertained that the delivery confirmation by the DSN is not requested at the step S417, the device GF proceeds to a step S425, and checks whether the "Disposition-Notification-To:" field is included in the mail header of the received transmission request message. If it, is ascertained at the step S425 that the "Disposition-Notification-To:" field is not included in the received transmission request message, the device GF determines that transmission request message does not request for the delivery confirmation by the MDN, and terminates the image-information transmission process.

If it is ascertained at the step S425 that the "Disposition-Notification-To:" field is included in the received transmission request message, the device GF creates a MDN delivery-confirmation mail message that shows a result of the image-information transmission and includes the information about the reception ability of the G3 facsimile device FF at a step S426. The device GF then transmits the created MDN delivery-confirmation mail message to a mail address specified in the "Disposition-Notification-To:" field at a step S427.

The above-described use of the delivery-confirmation mail message with the reception ability may be applied to the facsimile gateway device GFa in the communication system shown in FIG. 12 so as to efficiently exchange the image information between the data terminal device DT and the G4 facsimile device FFa.

In this case, the facsimile gateway device GFa and the G4 facsimile device FFa exchanges the document function list command CDCL and the response RDCLP acknowledging a document function list twice in the G4 facsimile transmission procedure.

The facsimile gateway device GFa obtains the reception ability of the G4 facsimile device FFa for the first time exchanging the command CDCL and the response RDCLP in the G4 facsimile transmission procedure. The reception ability of the G4 facsimile device FFa is then adjusted by exchanging the command CDCL and the response RDCLP between the facsimile gateway device FFa and the G4 facsimile device FFa for the second time in the same G4 facsimile transmission procedure.

Figure 20A:
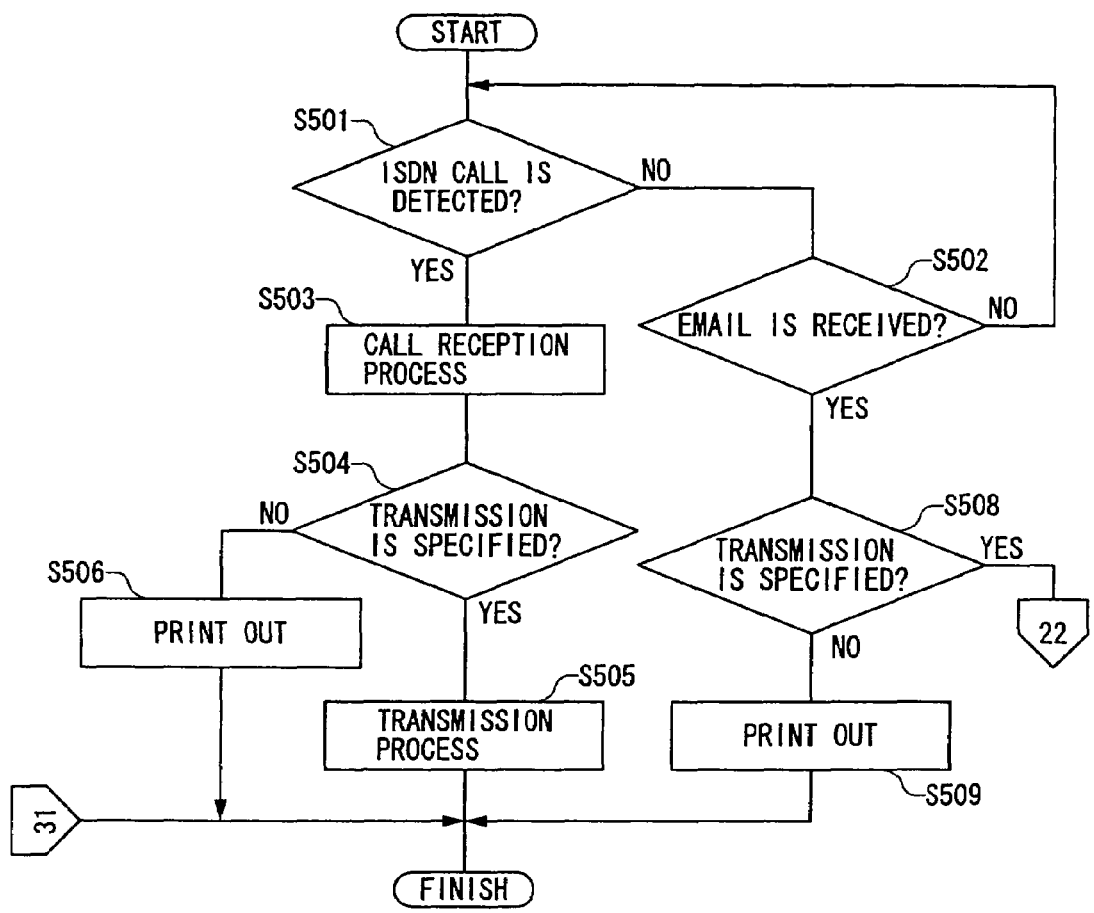
Figure 20B:
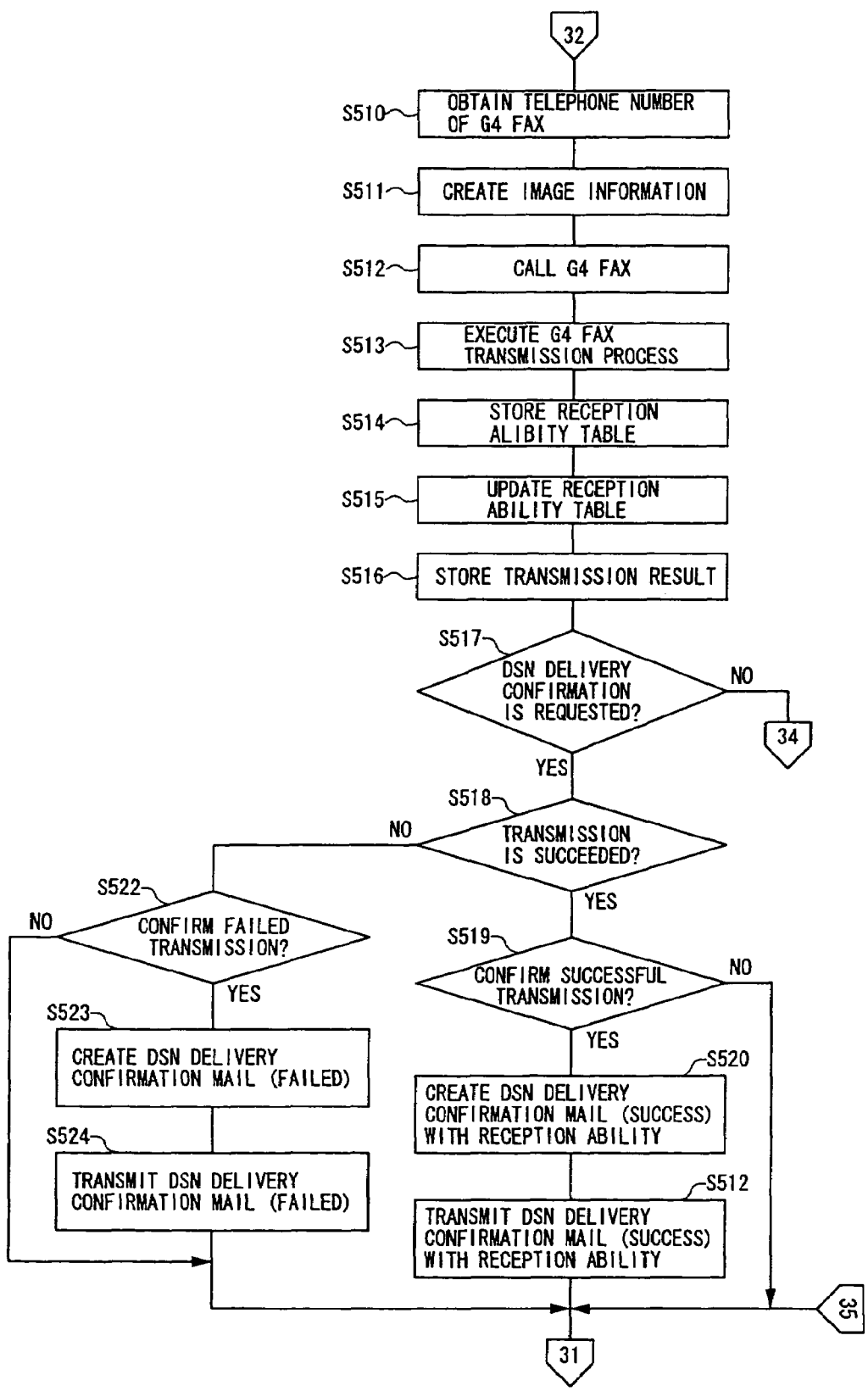

FIGS. 20A, 20B and 20C are flowcharts showing a second image-information transmission process taken by the facsimile gateway device GFa in the second embodiment of the present invention, by use of the delivery-confirmation mail message that includes the reception ability.

The facsimile gateway device GFa initially detects a reception of a call from the ISDN or an email message (NO at a step S501 and NO at a step S502).

In a case that the facsimile gateway device GFa receives the call from the ISDN at the step S501, the device GFa proceeds to a step S503. At the step S503, the device GFa executes a fixed call reception process, receives image information by executing the G4 facsimile transmission procedure between the device GFa and the G4 facsimile device FFa, and stores the received image information therein.

The device GFa checks whether a destination address of the image information is specified in order to transmit the received image information to a user of the data terminal device DT or the G4 facsimile device FFa at a step S504. If it is ascertained at the step S504 that the destination address of the image information is specified, the device GFa proceeds to a step S505 and executes a fixed transmission process that transmits the image information to the specified destination address. The device GFa then terminates the image-information transmission process.

If it is ascertained at the step S504 that the destination address of the image information is not specified, the device GFa prints out the stored image information at a step S506, and then terminates the image-information transmission process.

If the device GFa receives an email message at the step S502, it checks whether the destination address of the image information is specified in the email message at a step S508. If it ascertained at the step S508 that the destination address of the image information is not specified, the device GFa extracts the image information from text information of the received email message, and prints out the extracted image information at a step S509. The device GFa then terminates the image-information transmission process.

If it is ascertained at the step S508 that the destination address of the image information is specified, the email message received from the data terminal device DT by the device GFa is a transmission request message. Accordingly, at a step S510, the device GFa obtains a telephone number of the G4 facsimile device FFa as the destination address of the image information from the received transmission request message. The device GFa then creates the image information from the text information of the received transmission request message at a step S511. Subsequently, at a step S512, the device GFa calls the telephone number obtained at the step S510. At a step S513, the device GFa executes the fixed G4 facsimile transmission procedure and transmits the image information created at the step S511 to the destination address. At a step S514, the device GFa then records, on the reception ability table, a reception ability of the G4 facsimile device FFa that corresponds to contents of the document function list command CDCL obtained from the G4 facsimile device FFa as the destination address during the image-information transmission.

The device GFa then stores a result of the image-information transmission at a step S516. For instance, the device GFa stores a result that indicates a successful transmission if the device GFa receives the signal RDPBP or the signal RDEP for each page transmitted, and stores a result that indicates a failed transmission if the device GFa does not receive the signal RDPBP or the signal RDEP for any page transmitted.

At a step S517, when receiving the transmission request message, the device GFa checks whether the transmission request message requests the delivery confirmation by the DSN. If it is ascertained that the delivery confirmation by the DSN is requested, the device GFa also checks whether the image-information transmission to the G4 facsimile device FFa is completed without any errors at a step S518.

If it is ascertained at the step S518 that the image transmission is successfully completed, the device GFa proceeds to a step S519, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURE" indicating that a confirmation of a successful delivery is requested, at a step S520, the device GFa creates a DSN delivery-confirmation mail message that indicates the successful transmission and includes information about the reception ability of the G4 facsimile device FFa stored at the step S514. Subsequently, the device GFa transmits the created DSN delivery-confirmation mail message that includes the reception ability of the G4 facsimile device FFa to a mail address notified in the "MAIL-FROM:" field at a step 521, and terminates the image-information transmission process.

If the value of the "XX" is found to be "FAILURE" at the step S519, the device GFa does not creates the DSN delivery-confirmation mail message, and terminates the image-information transmission process.

If it is ascertained at the step S518 that the image transmission is failed, the device GFa proceeds to a step S522, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GFa creates the DSN delivery-confirmation mail message that indicates the failure of the transmission at a step S523, transmits the created DSN delivery-confirmation mail message to the mail address notified in the "MAIL FROM:" field at a step S524, and terminates the image-information transmission process. It should be noted that the DSN delivery-confirmation mail message that indicates the failed transmission may include information about the reception ability of the G4 facsimile device FFa.

If the value of the "XX" is found to be "SUCCESS" at the step S522, the device GFa does not creates the DSN delivery-confirmation mail message, and terminates the image-information transmission process.

If it is ascertained that the delivery confirmation by the DSN is not requested at the step S517, the device GFa proceeds to a step S525, and checks whether the "Disposition-Notification-To:" field is included in the mail header of the received transmission request message. If it is ascertained at the step S525 that the "Disposition-Notification-To:" field is not included in the received transmission request message, the device GFa determines that transmission request message does not request for the delivery confirmation by the MDN, and terminates the image-information transmission process.

If it is ascertained at the step S525 that the "Disposition-Notification-To:" field is included in the received transmission request message, the device GFa creates a MDN delivery-confirmation mail message as described above that shows a result of the image-information transmission and includes the information about the reception ability of the G4 facsimile device FF at a step S526. The device GFa then transmits the created MDN delivery-confirmation mail message to a mail address specified in the "Disposition-Notification-To:" field at a step S527.

A description will now be given of a communication system wherein the facsimile gateway device GF (or GFa) transmits a first delivery-confirmation mail message and a second delivery-confirmation mail message to the data terminal device DT. The facsimile gateway device GF (or GFa) transmits the first delivery-confirmation mail message to the data terminal device DT, a sender, after receiving the transmission request message therefrom, and then transmits the second delivery-confirmation mail message to the data terminal device DT notifying the result of the image-information transmission after completing the image-information transmission to the G3 facsimile device FF (or the G4 facsimile device FFa). Accordingly, a user of the data terminal device DT can recognize a current detailed situation of the image-information transmission requested by the user. Such communication system provides the user of the data terminal device DT a security.

FIGS. 30 and 31 show respectively, one form of the first DSN delivery-confirmation mail message and one form of the first MDN delivery-confirmation mail message.

In the first DSN delivery-confirmation mail message shown in FIG. 21, a line "Action: relayed" indicates that the image information from the data terminal device DT is relayed at the facsimile gateway device GF (or GFa). Similarly, in the first MDN delivery-confirmation mail message shown in FIG. 22, a line "Disposition: manual-action/MDN-sent-manually; dispatched" indicates that the image information from the data terminal device DT is replayed at the facsimile gateway device GF (or GFa).

Additionally, FIGS. 32 and 33 show respectively, one form of the second DSN delivery-confirmation mail message that indicates a successful transmission, and one form of the second MDN delivery-confirmation mail message that also indicates a successful transmission.

In FIG. 23, a line "Action: delivered" indicates that the image information from the data terminal device DT is delivered to its destination address, the G3 facsimile device FF (or the G4 facsimile device FFa). Similarly, in FIG. 24, a line "Disposition: manual-action/MDN-sent-manually; displayed" indicates that the image information from the data terminal device DT is delivered to its destination address, the G3 facsimile device FF (or the G4 facsimile device FFa).

Additionally, FIGS. 34 and 35 show respectively, one form of the second DSN delivery-confirmation mail message that indicates a failed transmission, and one form of the second MDN delivery-confirmation mail message that also indicates a failed transmission.

In FIG. 25, a line "Action: failed" indicates that the image-information transmission from the data terminal device DT to the G3 facsimile device FF (or the G4 facsimile device FFa), the destination address, is completely or partially failed. Similarly, in FIG. 26, a line "Disposition: manual-action/MDN-sent-manually; failed" indicates that the image information from the data terminal device DT to the G3 facsimile device FF (or the G4 facsimile device FFa), the destination address, is completely or partially failed.

Figure 27A:
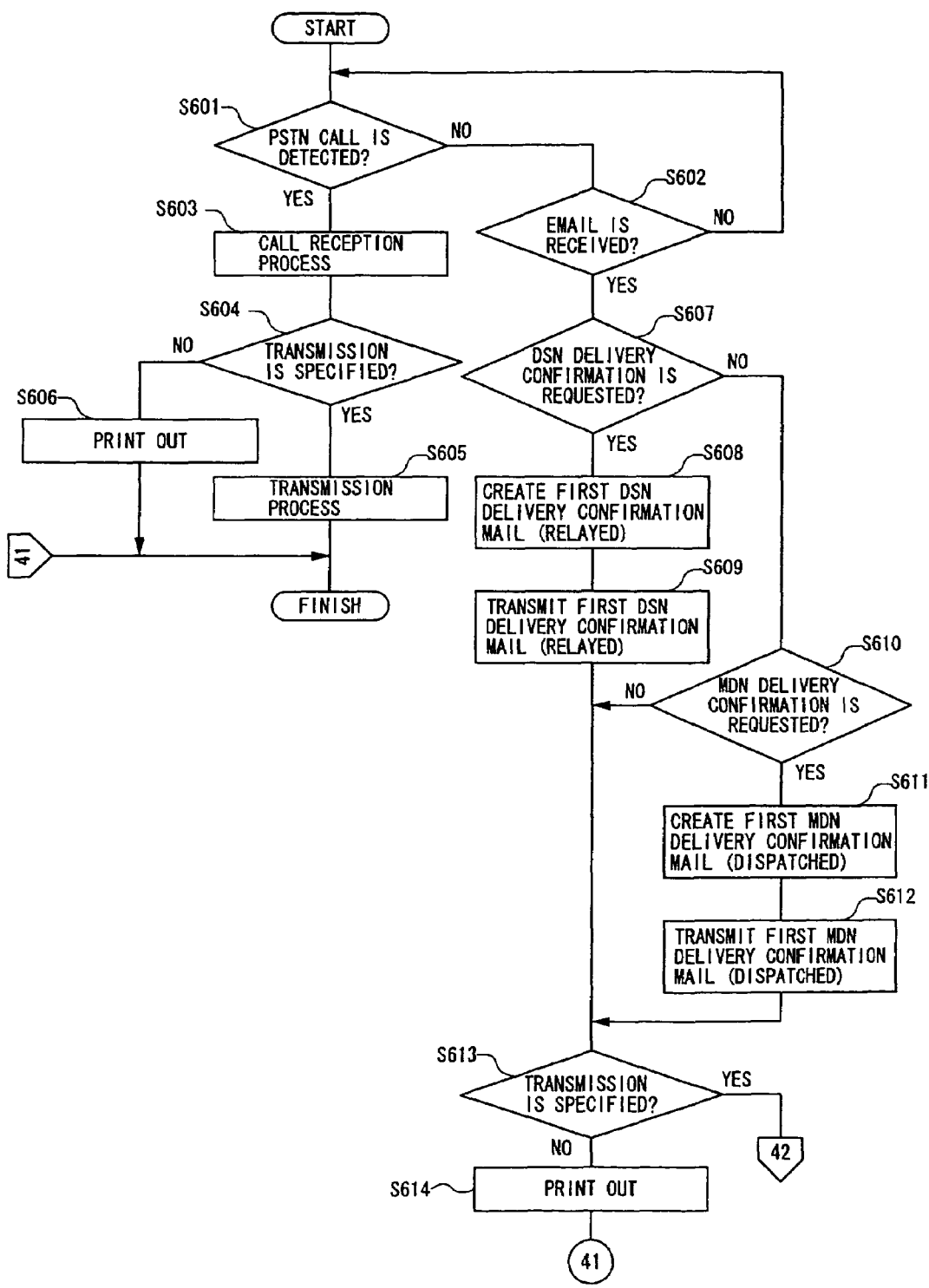
Figure 27B:
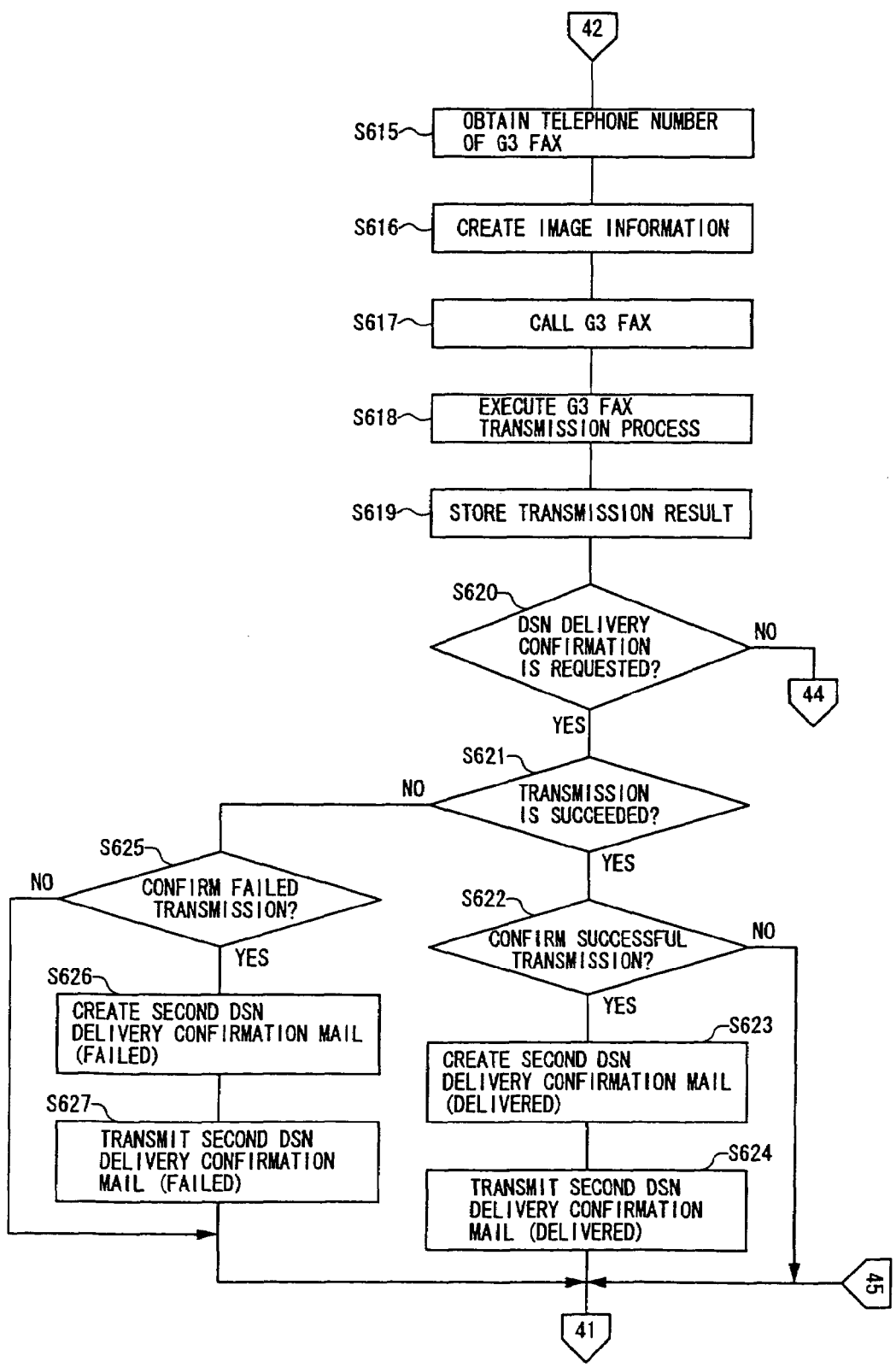

FIGS. 27A, 27B and 27C are flowcharts showing a third image-information transmission process taken by the facsimile gateway device GF in the first embodiment of the present invention, wherein the facsimile gateway device GF transmits the first delivery-confirmation mail message and the second delivery-confirmation mail message to the data terminal device DT.

The facsimile gateway device GF initially detects a reception of a call from the PSTN or an email message (NO at a step S601 and NO at a step S602).

In a case that the facsimile gateway device GF receives the call from the PSTN at the step S601, the device GF proceeds to a step S603. At the step S603, the device GF executes a fixed call reception process, receives image information by executing the G3 facsimile transmission procedure between the device GF and the G3 facsimile device FF, and stores the received image information therein.

The device GF checks whether a destination address of the image information is specified in order to transmit the received image information to a user of the data terminal device DT or the G3 facsimile device FF at a step S604. If it is ascertained at the step S604 that the destination address of the image information is specified, the device GF proceeds to a step S605 and executes a fixed transmission process that transmits the image information to the specified destination address. The device GF then terminates the image-information transmission process.

If it is ascertained at the step S604 that the destination address of the image information is not specified, the device GF prints out the stored image information at a step S606, and then terminates the image-information transmission process.

If the device GF receives an email message at the step S602, it checks whether the received email message requests a DSN delivery-confirmation mail message at a step S607. If it is ascertained at the step S607 that the received email message requests the DSN delivery-confirmation mail message, the device GF creates a first DSN delivery-confirmation mail message that indicates the successful transmission of the image information to the G3 facsimile device FF at a step S608. Subsequently, at a step S609, the device GF transmits the first DSN delivery-confirmation mail message created at the step S608 to the data terminal device DT. The device GF then proceeds to a later described step S613.

If it is ascertained at the step S607 that the delivery confirmation by the DSN is not requested by the received email message, the device GF proceeds to a step S610. The device GF checks whether the received email message requests a MDN delivery-confirmation mail message at the step S610. If it is ascertained at the step S610 that the received email message requests the MDN delivery-confirmation mail message, the device GF creates a first MDN delivery-confirmation mail message that indicates the successful transmission of the image information to the G3 facsimile device FF at a step S611. Subsequently, at a step S612, the device GF transmits the first MDN delivery-confirmation mail message created at the step S611 to the data terminal device DT. The device GF then proceeds to the later described step S613.

If the delivery confirmation by the DSN is not requested at the step S607 and the MDN delivery-confirmation mail message is not requested at the step S610, the device GF does not transmit the first delivery-confirmation mail message to the data terminal device DT, and proceeds to the step S613.

At the step S613, the device GF checks whether the destination address of the image information is specified in the email message. If it is ascertained at the step S613 that the destination address of the image information is not specified, the device GF extracts the image information from text information of the received email message, and prints out the extracted image information at a step S614. The device GF then terminates the image-information transmission process.

If it is ascertained at the step S613 that the destination address of the image information is specified, the email message received from the data terminal device DT by the device GF is a transmission request message. Accordingly, at a step S615, the device GF obtains a telephone number of the G3 facsimile device FF as the destination address of the image information from the received transmission request message. The device GF then creates the image information from the text information of the received transmission request message at a step S616. Subsequently, at a step S617, the device GF calls the telephone number obtained at the step S615. At a step S618, the device GF executes the fixed G3 facsimile transmission procedure and transmits the image information created at the step S616 to the destination address. The device GF then stores a result of the image-information transmission at a step S619. For instance, the device GF stores a result that indicates a successful transmission if the device GF receives the signal MCF for each page transmitted, and stores a result that indicates a failed transmission if the device GF does not receive the signal MCF for any page transmitted.

Additionally, when receiving the transmission request message, the device GF checks whether the transmission request message requests the delivery confirmation by the DSN at a step S620. If it is ascertained that the delivery confirmation by the DSN is requested, the device GF checks whether the image-information transmission to the G3 facsimile device FF is completed without any errors at a step S621.

If it is ascertained at the step S621 that the image transmission is successfully completed, the device GF proceeds to a step S622, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURE" indicating that a confirmation of a successful delivery is requested, the device GF creates a second DSN delivery-confirmation mail message that indicates the success of the image-information transmission at a step S623, transmits the created second DSN delivery-confirmation mail message to a mail address notified in the "MAIL FROM:" field at a step S624, and terminates the image-information transmission process.

If the value of the "XX" is found to be "FAILURE" at the step S622, the device GF does not creates the second DSN delivery-confirmation mail message, and terminates the image-information transmission process.

If it is ascertained at the step S621 that the image transmission is failed, the device GF proceeds to a step S625, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GF creates a second DSN delivery-confirmation mail message that indicates the failure of the transmission at a step S626, transmits the created second DSN delivery-confirmation mail message to the mail address notified in the "MAIL FROM:" field at a step S627, and terminates the image-information transmission process.

If the value of the "XXX" is found to be "SUCCESS" at the step S625, the device GF does not creates the second DSN delivery-confirmation mail message, and terminates the image-information transmission process.

If it is ascertained that the delivery confirmation by the DSN is not requested at the step S620, the device GF proceeds to a step S630, and checks whether the "Disposition-Notification-To:" field is included in the mail header of the received transmission request message. If it is ascertained at the step S630 that the "Disposition-Notification-To:" field is not included in the received transmission request message, the device GF-determines that transmission request message does not request for the delivery confirmation by the MDN, and terminates the image-information transmission process.

If it is ascertained at the step S630 that the "Disposition-Notification-To:" field is included in the received transmission request message, the device GF creates a second MDN delivery-confirmation mail message as described above that shows a result of the image-information transmission at a step S631, and transmits the created second MDN delivery-confirmation mail message to a mail address specified in the "Disposition-Notification-To:" field at a step S632.

Figure 28A:
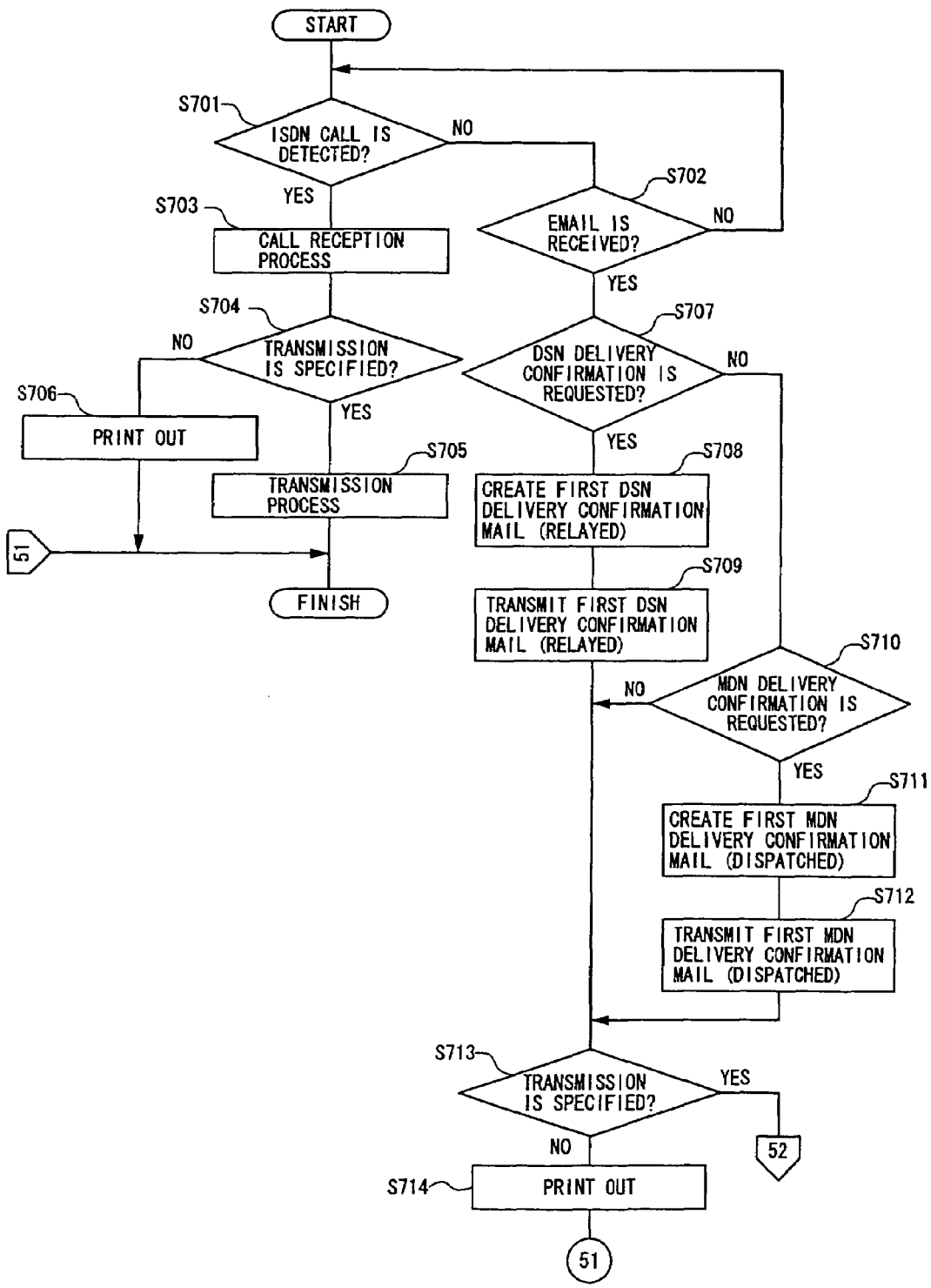
FIGS. 28A, 28B and 28C are flowcharts showing a third image-information transmission process taken by the facsimile gateway device GFa in the second embodiment of the present invention.
Figure 28B:
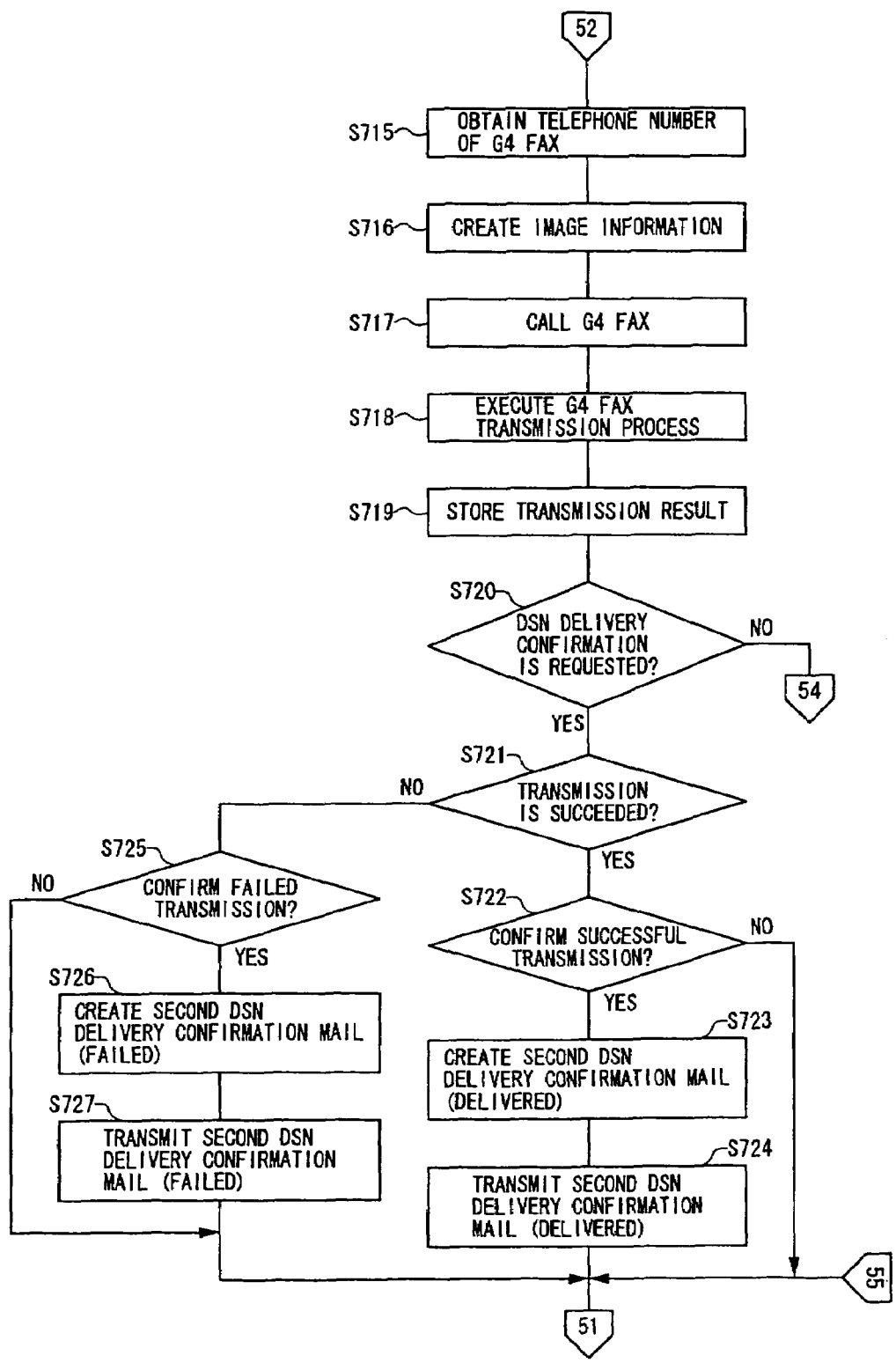
Figure 28C:
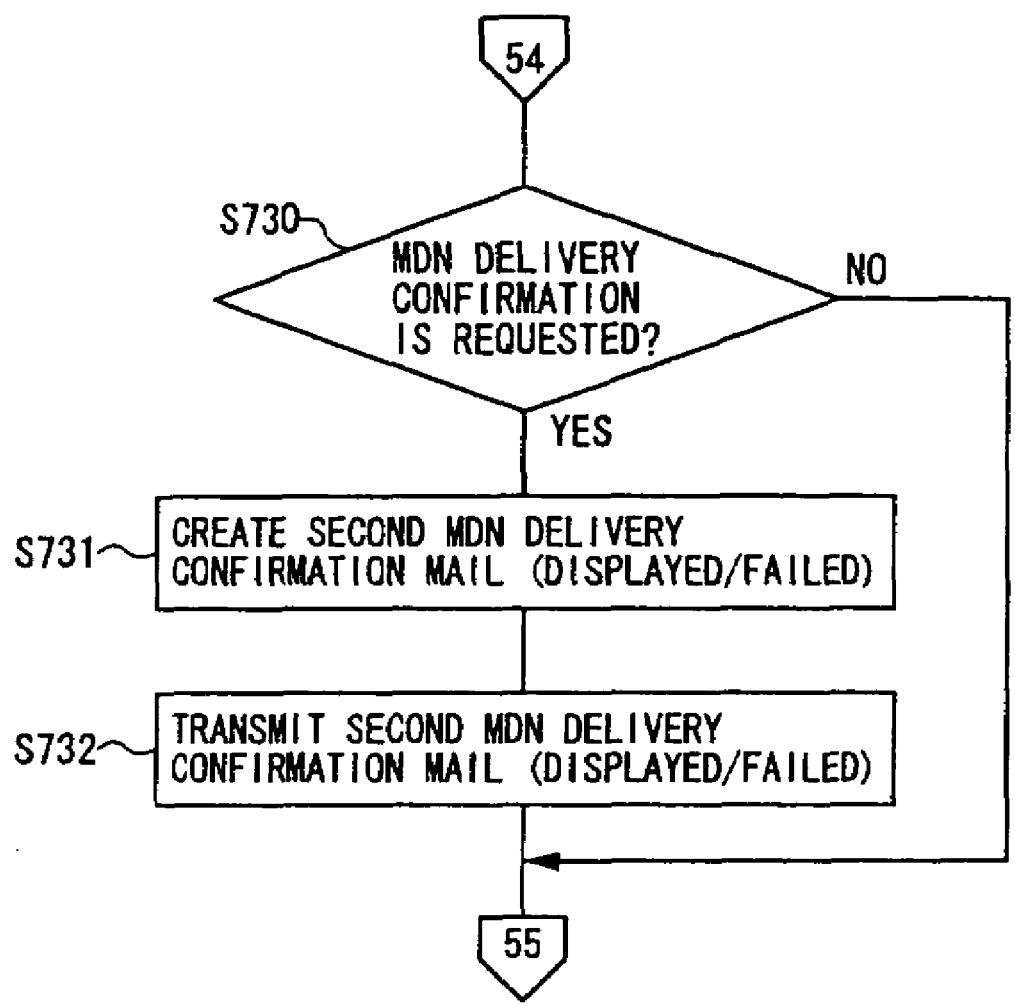

FIGS. 28A, 28B and 28C are flowcharts showing a third image-information transmission process taken by the facsimile gateway device GFa in the second embodiment of the present invention, wherein the facsimile gateway device GFa transmits the first delivery-confirmation mail message and the second delivery-confirmation mail message to the data terminal device DT.

The facsimile gateway device GFa initially detects a reception of a call from the ISDN or an email message (NO at a step S701 and NO at a step S702).

In a case that the facsimile gateway device GFa receives the call from the ISDN at the step S701, the device GFa proceeds to a step S703. At the step S703, the device GFa executes a fixed call reception process, receives image information by executing the G4 facsimile transmission procedure between the device GFa and the G4 facsimile device FFa, and stores the received image information therein.

The device GFa checks whether a destination address of the image information is specified in order to transmit the received image information to a user of the data terminal device DT or the G4 facsimile device FFa at a step S704. If it is ascertained at the step S704 that the destination address of the image information is specified, the device GFa proceeds to a step S705 and executes a fixed transmission process that transmits the image information to the specified destination address. The device GFa then terminates the image-information transmission process.

If it is ascertained at the step S704 that the destination address of the image information is not specified, the device GFa prints out the stored image information at a step S706, and then terminates the image-information transmission process.

If the device GFa receives an email message at the step S702, it checks whether the received email message requests a DSN delivery-confirmation mail message at a step S707. If it is ascertained at the step S707 that the received email message requests the DSN delivery-confirmation mail message, the device GFa creates a first DSN delivery-confirmation mail message that indicates the successful transmission of the image information to the G4 facsimile device FFa at a step S708. Subsequently, at a step S709, the device GFa transmits the first DSN delivery-confirmation mail message created at the step S708 to the data terminal device DT. The device GFa then proceeds to a later described step S713.

If it is ascertained at the step S707 that the delivery confirmation by the DSN is not requested by the received email message, the device GFa proceeds to a step S710. The device GFa checks whether the received email message requests a MDN delivery-confirmation mail message at the step S710. If it is ascertained at the step S710 that the received email message requests the MDN delivery-confirmation mail message, the device GFa creates a first MDN delivery-confirmation mail message that indicates the successful transmission of the image information to the G4 facsimile device FFa at a step S711. Subsequently, at a step S712, the device GFa transmits the first MDN delivery-confirmation mail message created at the step S711 to the data terminal device DT. The device GFa then proceeds to the later described step S713.

If the delivery confirmation by the DSN is not requested at the step S707 and the MDN delivery-confirmation mail message is not requested at the step S710, the device GFa does not transmit the first delivery-confirmation mail message to the data terminal device DT, and proceeds to the step S713.

At the step S713, the device GFa checks whether the destination address of the image information is specified in the email message. If it is ascertained at the step S713 that the destination address of the image information is not specified, the device GFa extracts the image information from text information of the received email message, and prints out the extracted image information at a step S714. The device GFa then terminates the image-information transmission process.

If it is ascertained at the step S713 that the destination address of the image information is specified, the email message received from the data terminal device DT by the device GFa is a transmission request message. Accordingly, at a step S715, the device GFa obtains a telephone number of the G4 facsimile device FFa as the destination address of the image information from the received transmission request message. The device GFa then creates the image information from the text information of the received transmission request message at a step S716. Subsequently, at a step S717, the device GFa calls the telephone number obtained at the step S715. At a step S718, the device GFa executes the fixed G4 facsimile transmission procedure and transmits the image information created at the step S716 to the destination address. The device GFa then stores a result of the image-information transmission at a step S719. For instance, the device GFa stores a result that indicates a successful transmission if the device GFa receives the signal RDPBP or the signal RDEP for each page transmitted, and stores a result that indicates a failed transmission if the device GFa does not receive the signal RDPBP or the signal RDEP for any page transmitted.

Additionally, when receiving the transmission request message, the device GFa checks whether the transmission request message requests the delivery confirmation by the DSN at a step S720. If it is ascertained that the delivery confirmation by the DSN is requested, the device GFa checks whether the image-information transmission to the G4 facsimile device FFa is completed without any errors at a step S721.

If it is ascertained at the step S721 that the image transmission is successfully completed, the device GFa proceeds to a step S722, and checks whether the value of "XX" of "NOTIFY='XX'" in the transmission request message requesting the delivery confirmation by the DSN is "SUCCESS" or "SUCCESS, FAILURE".

If the value of the "XX" is "SUCCESS" or "SUCCESS, FAILURE" indicating that a confirmation of a successful delivery is requested, the device GFa creates a second DSN delivery-confirmation mail message that indicates the success of the image-information transmission at a step S723, transmits the created second DSN delivery-confirmation mail message to a mail address notified in the "MAIL FROM:" field at a step S724, and terminates the image-information transmission process.

If the value of the "XX" is found to be "FAILURE" at the step S722, the device GFa does not creates the second DSN delivery-confirmation mail message, and terminates the image-information transmission process.

If it is ascertained at the step S721 that the image transmission is failed, the device GFa proceeds to a step S725, and checks whether the value of "XX" of "NOTIFY='XX'" in the transmission request message requesting the delivery confirmation by the DSN is "FAILURE" or "SUCCESS, FAILURE".

If the value of the "XX" is "FAILURE" or "SUCCESS, FAILURE" indicating that a confirmation of a failed delivery is requested, the device GFa creates a second DSN delivery-confirmation mail message that indicates the failure of the transmission at a step S726, transmits the created second DSN delivery-confirmation mail message to the mail address notified in the "MAIL FROM:" field at a step S727, and terminates the image-information transmission process.

If the value of the "XX" is found to be "SUCCESS" at the step S725, the device GFa does not creates the second DSN delivery-confirmation mail message, and terminates the image-information transmission process.

If it is ascertained that the delivery confirmation by the DSN is not requested at the step S720, the device GFa proceeds to a step S730, and checks whether the "Disposition-Notification-To:" field is included in the mail header of the received transmission request message. If it is ascertained at the step S730 that the "Disposition-Notification-To:" field is not included in the received transmission request message, the device GFa determines that transmission request message does not request for the delivery confirmation by the MDN, and terminates the image-information transmission process.

If it is ascertained at the step S730 that the "Disposition-Notification-To:" field is included in the received transmission request message, the device GFa creates a second MDN delivery-confirmation mail message as described above that shows a result of the image-information transmission at a step S731, and transmits the created second MDN delivery-confirmation mail message to a mail address specified in the "Disposition-Notification-To:" field at a step S732.

It should be noted that the contents of the delivery-confirmation mail messages in the above-described embodiments of the present invention are not restricted to the above-described form, and fields and elements in the delivery-confirmation mail message may be modified, added or eliminated.

Additionally, the above-described embodiments of the present invention describe a facsimile gateway device (an Internet facsimile gateway device) that has a terminal device function. However, the present invention may be similarly adopted for a facsimile gateway device that only includes a transmission function.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the invention.

The present application is based on Japanese Priority Application No. 2000-045560, filed on Feb. 23, 2000 with the Japanese Patent Office, the entire contents of which are hereby incorporated by reference.

What is claimed is:

1. A transmitting device comprising:
   image receiving unit configured to receive an image via electronic mail;
   an inputting device configured to receive a request for transmitting image information corresponding to the received image, to a receiving device;
   a transmitting unit configured to transmit the image information corresponding to the received image to the receiving device by transmission that does not include e-mail communication;
   a mail creating unit configured to create a mail including a delivery confirmation message for notifying a result of the transmission of the image information after the transmission of the image information that does not include e-mail communication is completed; and
   a mail transmitting unit configured to transmit the mail including the delivery confirmation message to an address corresponding to the request,
   wherein the mail including the delivery confirmation message further includes additional information regarding the transmission of the image information, the additional information including at least one of a total number of pages of the transmitted image information, a communication charge for the transmission, a time at which the transmission was completed, and the reception ability information of the transmission destination, and
   wherein after completion of reception of the image by the image receiving unit via the electronic mail, the mail including the delivery confirmation message is not transmitted by said mail transmitting unit until after the completion of the transmission by said transmitting unit of the image information.

2. The transmitting device as claimed in claim 1, wherein the mail is regulated by a DSN, and the mail creating unit is configured to create the mail regulated by the DSN notifying a successful image transmission after the transmission of the image information by said transmitting device succeeds, if said request requests said transmitting device to transmit the mail regulated by the DSN notifying the successful image transmission to the address corresponding to the request.

3. The transmitting device as claimed in claim 1, wherein the mail is regulated by the DSN, and the mail creating unit that creates the mail regulated by the DSN notifying a failed image transmission after the transmission of the image information by said transmitting device fails, if said request requests said transmitting device to transmit the mail regulated by the DSN notifying the failed image transmission to the address corresponding to the request.

4. The transmitting device as claimed in claim 1, wherein the mail is regulated by a MDN; and the mail creating unit is configured to create the mail regulated by the MDN notifying a successful image transmission after the transmission of the image information by said transmitting device succeeds, if said request requests said transmitting device to transmit the mail regulated by the MDN notifying the successful image transmission to the address corresponding to said request.

5. The transmitting device as claimed in claim 1, wherein the mail is regulated by a MDN; and the mail creating unit is configured to create the mail regulated by the MDN notifying a failed image transmission after the transmission of the image information by said transmitting device fails, if said request requests said transmitting device to transmit the mail regulated by the MDN notifying the failed image transmission to the address corresponding to the request.

6. A transmitting device comprising:
- image receiving unit configured to receive an image via electronic mail;
- an inputting device configured to receive a request for transmitting image information corresponding to the received image, to a receiving device;
- a transmitting unit configured to transmit the image information corresponding to the received image to the receiving device by transmission that does not include e-mail communication;
- a first mail creating unit configured to create first mail for notifying of a successful transmission of said request, after receiving said request if said request requests said transmitting device to transmit the first mail to an address corresponding to the request;
- a first mail transmitting unit configured to transmit the first mail to the address corresponding to the request;
- a second mail creating unit configured to create second mail including a delivery confirmation message for notifying of a result of the transmission of the image information by said transmitting device to the receiving device, after said transmission of the image information that does not include e-mail communication is completed; and
- a second mail transmitting unit configured to transmit to the address corresponding to the request the second mail including the delivery confirmation message,
- wherein the second mail including the delivery confirmation message further includes additional information regarding the transmission of the image information, the additional information including at least one of a total number of pages of the transmitted image information, a communication charge for the transmission, a time at which the transmission was completed, and the reception ability information of the transmission destination, and
- wherein after completion of reception of the image by the image receiving unit via the electronic mail, the mail including the delivery confirmation message is not transmitted by said mail transmitting unit until after the completion of the transmission by said transmitting unit of the image information.

7. The transmitting device as claimed in claim 6, wherein the first mail is regulated by a DSN, and the second mail is regulated by the DSN, and wherein the second mail creating unit is configured to create the second mail regulated by the DSN notifying of a successful image transmission after the transmission of the image information by said transmitting device succeeds, if said request requests said transmitting device to transmit the mail regulated by the DSN notifying of the successful image transmission to the address corresponding to the request.

8. The transmitting device as claimed in claim 6, wherein the first mail is regulated by the DSN, and the second mail is regulated by the DSN, and wherein the second mail creating unit is configured to create the second mail regulated by the DSN notifying of a failed image transmission after the transmission of the image information by said transmitting device fails, is said request requests said transmitting device to transmit the second mail regulated by the DSN notifying of the failed image transmission to the address corresponding to said request.

9. The transmitting device as claimed in claim 6, wherein the first mail is regulated by a MDN, and the second mail is regulated by the MDN, and wherein the second mail creating unit is configured to create the second mail regulated by the MDN notifying of a successful image transmission after the transmission of the image information by said transmitting device succeeds, if said request requests said transmitting device to transmit the second mail regulated by the MDN notifying of the successful image transmission to the address corresponding to the request.

10. The transmitting device as claimed in claim 6, wherein the first mail is regulated by the MDN, and the second mail is regulated by the MDN, and wherein the second mail creating unit is configured to create the second mail regulated by the MDN notifying of a failed image transmission after the transmission of the image information by said transmitting device fails, if said request requests said transmitting device to transmit the second mail regulated by the MDN notifying of the failed image transmission to the address corresponding to said request.

11. The transmitting device as claimed in claim 6, wherein said information about the transmission in the second mail indicates the reception ability information of the transmission destination.

* * * * *